United States Patent
Singer et al.

(10) Patent No.: US 11,557,034 B2
(45) Date of Patent: Jan. 17, 2023

(54) FULLY AUTOMATIC, TEMPLATE-FREE PARTICLE PICKING FOR ELECTRON MICROSCOPY

(71) Applicant: The Trustees of Princeton University, Princeton, NJ (US)

(72) Inventors: Amit Singer, Princeton, NJ (US); Ayelet Heimowitz, Princeton, NJ (US); Joakim Anden, Princeton, NJ (US); Yuehaw Khoo, Princeton, NJ (US); Joseph Kileel, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 16/621,306

(22) PCT Filed: Jun. 13, 2018

(86) PCT No.: PCT/US2018/037375
§ 371 (c)(1),
(2) Date: Dec. 11, 2019

(87) PCT Pub. No.: WO2019/190576
PCT Pub. Date: Oct. 3, 2019

(65) Prior Publication Data
US 2020/0167913 A1  May 28, 2020

Related U.S. Application Data

(60) Provisional application No. 62/614,007, filed on Jan. 5, 2018, provisional application No. 62/518,975, filed on Jun. 13, 2017.

(51) Int. Cl.
*G06T 7/00* (2017.01)
*G06T 7/32* (2017.01)
(Continued)

(52) U.S. Cl.
CPC ............. *G06T 7/0012* (2013.01); *G06T 7/11* (2017.01); *G06T 7/32* (2017.01); *G06V 20/695* (2022.01);
(Continued)

(58) Field of Classification Search
CPC . G06T 7/0012; G06T 7/32; G06T 7/11; G06T 2207/10056; G06T 2207/20021;
(Continued)

(56) References Cited

U.S. PATENT DOCUMENTS 7,418,693 B1   8/2008  Gennari et al.
7,958,063 B2 * 6/2011  Long ................... G06K 9/6269
                                                            706/45
(Continued)

FOREIGN PATENT DOCUMENTS

JP      4899170 B2 *   3/2012
JP      2017-067746 A   4/2017
(Continued)

OTHER PUBLICATIONS

Aebeláez et al., "Experimental evaluation of support vector machine-based and correlation-based approaches to automatic particle selection," Journal of Structural Biology, 2011, 175, 319-328.
(Continued)

*Primary Examiner* — Vu Le
*Assistant Examiner* — Winta Gebreslassie
(74) *Attorney, Agent, or Firm* — Michael Best & Friedrich LLP

(57) ABSTRACT

Systems and methods are described for the fully automatic, template-free locating and extracting of a plurality of two-dimensional projections of particles in a micrograph image. A set of reference images is automatically assembled from a micrograph image by analyzing the image data in each of a plurality of partially overlapping windows and identifying
(Continued)

a subset of windows with image data satisfying at least one statistic criterion compared to other windows. A normalized cross-correlation is then calculated between the image data in each reference image and the image data in each of a plurality of query image windows. Based on this cross-correlation analysis, a plurality of locations in the micrograph is automatically identified as containing a two-dimensional projection of a different instance of the particle of the first type. The two-dimensional projections identified in the micrograph are then used to determine the three-dimensional structure of the particle.

20 Claims, 11 Drawing Sheets

(51) Int. Cl.
  *G06T 7/11* (2017.01)
  *G06V 20/69* (2022.01)
(52) U.S. Cl.
  CPC ............. *G06T 2207/10056* (2013.01); *G06T 2207/20021* (2013.01); *G06T 2207/20081* (2013.01)
(58) Field of Classification Search
  CPC ......... G06T 2207/20081; G06T 7/0014; G06T 11/00; G06K 9/0014
  See application file for complete search history.

(56) References Cited

U.S. PATENT DOCUMENTS

| | | | |
|---|---|---|---|
| 8,577,171 B1* | 11/2013 | Mollon | G06T 5/006 250/311 |
| 9,747,709 B2 | 8/2017 | Teshigawara et al. | |
| 2003/0105675 A1 | 6/2003 | Saitou | |
| 2005/0119835 A1 | 6/2005 | Kita et al. | |
| 2007/0120055 A1 | 5/2007 | Sawada et al. | |
| 2007/0197894 A1 | 8/2007 | Jo et al. | |
| 2008/0212880 A1 | 9/2008 | Homman et al. | |
| 2009/0226096 A1 | 9/2009 | Namai et al. | |
| 2010/0010946 A1 | 1/2010 | De Winter et al. | |
| 2012/0250975 A1 | 10/2012 | Homman et al. | |
| 2016/0267315 A1* | 9/2016 | Roth | G06T 7/194 |
| 2017/0103161 A1* | 4/2017 | Brubaker | G16B 15/00 |

FOREIGN PATENT DOCUMENTS

| | | | |
|---|---|---|---|
| JP | 2017067746 A | 4/2017 | |
| WO | 0204924 A1 | 1/2002 | |
| WO | 0319523 A1 | 3/2003 | |
| WO | WO 2003/105675 A2 | 12/2003 | |
| WO | 2014144820 A1 | 9/2014 | |

OTHER PUBLICATIONS

Bai et al., "How cryo-EM is revolutionizing structural biology," Trends in Biochemical Sciences, 2015, 40(1):49-57.
Barnett et al., "Rapid Solution of the Cryo-EM Reconstruction Problem by Frequency Marching," SIAM J. Imaging Sciences, 2017, 10(3):1170-1195.
Bendory et al., "Bispectrum inversion with application to multireference alignment," IEEE Transactions on Signal Processing, 2018, 66(4):1037-1050.
Bhamre et al., "Denoising and covariance estimation of single particle cryo-EM images," Journal of Structural Biology, 2016, 195(1):72-81.
Bhamre et al., "Orthogonal Matrix Retrieval in Cryo-Electron Microscopy," 12th IEEE International Symposium on Biomedical Imaging, 2015, pp. 1048-1052.
Bhamre et al., "Anisotropic twicing for single particle reconstruction using autocorrelation analysis", https://arxiv.org/abs/1704.07969 (2017) 34 pages.
Boumal et al., "Manopt, a Matlab toolbox for optimization on manifolds," Journal of Machine Learning Research, 2014, 15:1455-1459.
Burvall et al., "Phase retrieval in X-ray phase-contrast imaging suitable for tomography," Optics express, 2011, 19(11), 10359-10376.
Chen et al., "High-resolution noise substitution to measure overfitting and validate resolution in 3D structure determination by single particle electron cryomicroscopy," Ultramicroscopy, 2013, 135, 24-35.
Chen et al., "SIGNATURE: A single-particle selection system for molecular electron microscopy," Journal of Structural Biology, 2007, 157, 168-173.
Cheng, "Random Matrices in High-dimensional Data Analysis," Princeton University Doctoral Dissertation, 2013, 136 pages.
Cowtan, K., (2014). Kevin cowtan's picture book of fourier transforms. <http://www.ysbl.york.ac.uk/~cowtan/fourier/fourier.html>.
Cristianini et al., (2000). An Introduction to Support Vector Machines: And Other Kernel-based Learn-ing Methods. New York, NY, USA: Cambridge University Press.
Frank et al., "Automatic selection of molecular images from electron micrographs," Ultramicroscopy, 1983-1984, 12(3): 169-175.
Gao et al., "TRPV1 structures in nanodiscs reveal mechanisms of ligand and lipid action," Nature, 2016, 534(5):347-351.
Glaeser, "Historical background: why is it important to improve automated particle selection methods?" Journal of Structural Biology, 2004, 145(1-2):15-18.
Goncharov, "Integral geometry and three-dimensional reconstruction of randomly oriented identical particles from their electron microphotos," Acta Applicandae Mathematica, 1988, 11(3):199-211.
Grigorieff, "FREALIGN: High-resolution refinement of single particle structures," Journal of Structural Biology, 2007, 157(1):117-125.
Harauz et al., "Automatic selection of macromolecules from electron micrographs by component labelling and symbolic processing," Ultramicroscopy, 1989, 31(4):333-344.
Heimowitz et al., "APPLE Picker: Automatic Particle Picking, a Low Effort Cryo-EM framework," Journal of Structural Biology, Nov. 2018, 204(2):215-227.
Henderson, "Realizing the potential of electron cryo-microscopy," Quarterly Reviews of Biophysics, 2004, 37(1):3-13.
Hoang et al., "gEMpicker: a highly parallel GPU-accelerated particle picking tool for cryo-electron microscopy," BMC Structural Biology, 2013, 13:25.
Hosseinizadeh et al., "Single-particle structure determination by X-ray free-electron lasers: Possibilities and challenges," Structural dynamics, 2015, 2(4):041601.
International Search Report and Written Opinion for Application No. PCT/US2018/029452 dated Dec. 31, 2018 (11 pages).
International Search Report and Written Opinion for Application No. PCT/US2018/037375 dated Nov. 1, 2019 (11 pages).
Iudin et al., "EMPIAR: A public archive for raw electron microscopy image data," Nature Methods, 2016, 13(5):387-388.
Kam et al., "Three-dimensional reconstruction of the shape of human wart virus using spatial correlations," Ultramicroscopy, 1985, 17(3):251-262.
Kam, "Determination of Macromolecular Structure in Solution by Spatial Correlation of Scattering Fluctuations," Macromolecules, 1977, 10(5):927-934.
Kam, "The reconstruction of structure from electron micrographs of randomly oriented particles," Journal of Theoretical Biology, 1980, 82(1):15-39.
Kecman, V. (2001). Learning and Soft Computing: Support Vector Machines, Neural Networks, and Fuzzy Logic Models. Cambridge, MA, USA: MIT Press.
Keller, "Closest Unitary, Orthogonal and Hermitian Operators to a Given Operator," Mathematics Magazine, 1975, 48(4):192-197.
Klein, F. (1914). Lectures on the icosahedron and the solution of equations of the fifth degree. London. 16, pp. 288-289.

(56) References Cited

OTHER PUBLICATIONS

Klug et al., "Three-dimensional Image Reconstruction from the Viewpoint of information Theory," Nature, 1972, 238(5365):435-440.
Kühlbrandt, "Biochemistry. The resolution revolution," Science, 2014, 343(6178):1443-1444.
Langlois et al., "Automated particle picking for low-contrast macromolecules in cryo-electron microscopy," Journal of Structural Biology, 2014, 186(1):1-7.
Liu et al., "Phase retrieval in x-ray imaging based on using structured illumination," Physical Review A, 2008, 78, 023817.
Ludtke et al., "Eman: Semiautomated software for high-resolution single-particle reconstructions," J Struct Biol, 1999, 128(1):82-97.
Main, "A theoretical comparison of the [beta],[gamma]' and 2Fo-Fc syntheses," Acta Crystallographica Section A, 1979, 35(5):779-785.
Marabini et al., "Xmipp: An Image Processing Package for Electron Microscopy," Journal of Structural Biology, 1996, 116(1):237-240.
Nicholson et al., "Review: Automatic particle detection in electron microscopy," Journal of Structural Biology, 2001, 133(2-3):90-101.
Ogura et al., "Automatic particle pickup method using a neural network has high accuracy by applying an initial weight derived from eigenimages: a new reference free method for single-particle analysis," Journal of Structural Biology, 2004, 145, 63-75.
Pettersen et al., "UCSF Chimera—a visualization system for exploratory research and analysis," Journal of Computational Chemistry, 2004, 25(13):1605-1612.
Pfeiffer et al., "Phase retrieval and differential phase-contrast imaging with low-brilliance X-ray sources," Nat Phys, 2006, 2(4):258-261.
Punjani et al., "cryoSPARC: algorithms for rapid unsupervised cryo-EM structure determination," Nature Methods, 2017, 14:290-296.
Radermacher et al., "Three-dimensional structure of the large ribosomal subunit from *Escherichia coli*," EMBO J, 1987, 6(4):1107-1114.
Roseman, "FindEM—a fast, efficient program for automatic selection of particles from electron micrographs," Journal of Structural Biology, 2004, 145(1-2):91-99.
Rossmann et al., "The detection of sub-units within the crystallographic asymmetric unit," Acta Crystallographica, 1962, 15(1):24-31.
Rossmann, "Molecular replacement—historical background," Acta Crystallographica Section D, 2001, 57(10):1360-1366.
Saldin et al., "Structure of isolated biomolecules obtained from ultrashort x-ray pulses: exploiting the symmetry of random orientations," Journal of Physics: Condensed Matter, 2009, 21(13):134014.
Salzman, "A method of general moments for orienting 2D projections of unknown 3D objects," Computer Vision, Graphics, and Image Processing, 1990, 50(2):129-156.
Scapin, "Molecular replacement then and now," Acta Crystallographica Section D, 2013, 69(11):2266-2275.
Scheres et al., "Prevention of overfitting in cryo-EM structure determination," Nature Methods, 2012, 9(9):853-854.
Scheres, "RELION: Implementation of a Bayesian approach to cryo-EM structure determination," Journal of Structural Biology, 2012, 180(3):519-530.
Scheres, "Semi-automated selection of cryo-EM particles in RELION-1.3," Journal of Structural Biology, 2015, 189(2):114-122.
Schölkopf, B., & Smola, A. J. (2001). Learning with Kernels: Support Vector Machines, Regularization, Optimization, and Beyond. Cambridge, MA, USA: MIT Press.
Shaikh et al., "SPIDER image processing for single-particle reconstruction of biological macromolecules from electron micrographs," Nature Protocols, 2008, 3(12):1941-1974.
Shatsky et al., "A method for the alignment of heterogeneous macromolecules from electron microscopy," Journal of Structural Biology, 2009, 166(1):67-78.
Sigworth, "Classical detection theory and the cryo-EM particle selection problem," Journal of Structural Biology, 2004, 145, 111-122.
Singer et al., "Detecting consistent common lines in cryo-EM by voting," Journal of Structural Biology, 2009, 169(3):312-322.
Singer et al., "Three-dimensional structure determination from common lines in cryo-EM by eigenvectors and semidefinite programming," SIAM Journal on Imaging Sciences, 2011, 4(2):543-572.
Spahn et al., "Exploring conformational modes of macromolecular assemblies by multiparticle cryo-EM," Current Opinion in Structural Biology, 2009, 19(5):623-631.
Starodub et al., "Single-particle structure determination by correlations of snapshot X-ray diffraction patterns," Nature Communications, 2012, 3, Article No. 1276.
Suykens et al., "Least Squares Support Vector Machine Classifiers," Neural Process. Lett., 1999, 9, 293-300.
Tang et al., "EMAN2: An extensible image processing suite for electron microscopy," Journal of Structural Biology, 2007, 157(1):38-46.
Tukey, J. W. (1977). Exploratory Data Analysis. Addison-Wesley.
Vainshtein, B. & Goncharov, A., "Determining the spatial orientation of arbitrarily arranged particles given their projections," Dokl. Acad. Sci. USSR 287, n. 5, 1131-1134 (1986). English translation: Soviet Physics Doklady, 31, 278.
Van Heel et al., "Use of multivariate statistics in analysing the images of biological macromolecules," Ultramicroscopy, 1981, 6(2):187-194.
Van Heel, "Angular reconstitution: A posteriori assignment of projection directions for 3D reconstruction," Ultramicroscopy, 1987, 21(2):111-123.
Van Heel, "Detection of objects in quantum-noise-limited images," Ultramicroscopy, 1982, 7(4):331-341.
Van Heel, "Multivariate statistical classification of noisy images (randomly oriented biological macromolecules)," Ultramicroscopy, 1983, 13(1):165-184.
Vapnik, V. N. (1995). The Nature of Statistical Learning Theory. New York, NY, USA: Springer-Verlag New York, Inc.
Voss et al., "DoG picker and TiltPicker: Software tools to facilitate particle selection in single particle electron microscopy," Journal of Structural Biology, 2009, 166(2):205-213.
Wang et al., DeepPicker: a deep learning approach for fully automated particle picking in cryo-EM, Journal of Structural Biology, 2016, 195(3):325-336.
Zhao et al., "Fast Steerable Principal Component Analysis," IEEE Transactions on Computational Imaging, 2016, 2(1):1-12.
Zhao et al., "Fourier-Bessel rotational invariant eigenimages," J. Opt. Soc. Am. A, 2013, 30(5):871-877.
Zhao et al., "Rotationally Invariant Image Representation for Viewing Direction Classification in Cryo-EM", Journal of Structural Biology, 2014, 186(1):153-166.
Zhou, "Multireference Alignment via Semidefinite Programming", Princeton University Senior Thesis (2013) 12 pages.
Zhu et al., "A deep convolutional neural network approach to single-particle recognition in cryo-electron microscopy," BMC Bioinformatics, 2017, 18, Article No. 348.
Zhu et al., "Automatic particle detection through efficient hough transforms," IEEE Transactions on Medical Imaging, 2003, 22, 1053-1062.
Zhu et al., "Automatic particle selection: results of a comparative study," Journal of Structural Biology, 2004, 145, 3-14.
International Search Report, PCT/US2018/037375, dated Nov. 1, 2019.
Written Opinion dated, PCT/US2018/037375, dated Nov. 1, 2019.
European Patent Office Extended Search Report for Application No. 18911417.6 dated Jan. 29, 2021 (7 pages).
Zhang et al., "A Two-Phase Improved Correlation Method for Automatic Particle Selection in Cryo-EM", IEEE/ACM Transactions on Computational Biology and Bioinformatics, vol. 14, No. 2, 2017, pp. 316-325.
Chinese Patent Office First Office Action for Application No. 201880046702.X dated Sep. 3, 2021 (21 pages including English translation).
Chinese Patent Office Second Office Action for Application No. 201880046702.X dated Apr. 1, 2022 (15 pages including English translation).

(56) References Cited

OTHER PUBLICATIONS

Chinese Patent Office Third Office Action for Application No. 201880046702.X dated Sep. 19, 2022 (6 pages including statement of relevance).

* cited by examiner

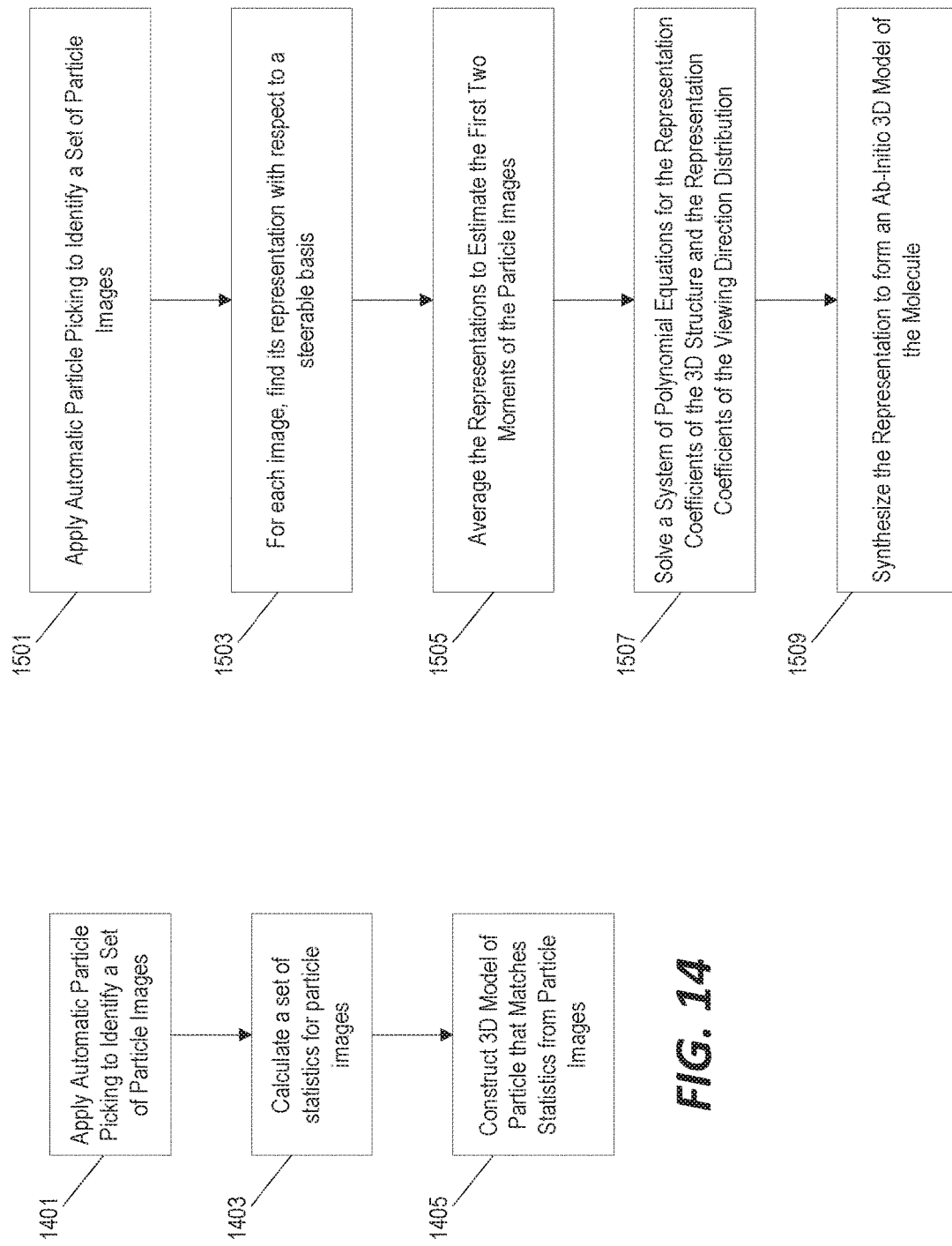

FULLY AUTOMATIC, TEMPLATE-FREE PARTICLE PICKING FOR ELECTRON MICROSCOPY

RELATED APPLICATIONS

This patent application is the U.S. national stage entry, under 35 U.S.C. 371, of International Application Number PCT/US2018/037375, filed Jun. 13, 2018, which claims the benefit of U.S. Provisional Application No. 62/518,975, filed Jun. 13, 2017, entitled "MAPPING HETEROGENEOUS OR TIME-VARYING OBJECTS USING LOW-ORDER MOMENTS," and U.S. Provisional Application No. 62/614,007, filed Jan. 5, 2018, entitled "FULLY AUTOMATIC TEMPLATE-FREE APPROACH TO PARTICLE PICKING IN ELECTRON MICROSCOPY," the entire contents of each of which are incorporated herein by reference.

STATEMENT REGARDING FEDERALLY SPONSORED RESEARCH OR DEVELOPMENT

This invention was made with government support under Grant No. GM090200 awarded by the National Institutes of Health and Grant No. FA9550-12-1-0317 awarded by the Air Force Office of Scientific Research. The government has certain rights in the invention.

BACKGROUND

The present invention relates to systems and methods for identifying two-dimensional projections of particles in an image of a solution containing particles.

SUMMARY

In some implementations, the systems and methods described herein provide a fully automatic, template-free particle picking for use in electron microscopy. In particular, the disclosed processes allow for identifying the noisy, two-dimensional projections of particles in micrographs obtained in cryo-electron microscopy (cryo-EM). In some implementations, the methods employ a fully automatic framework that harnesses information gathered by a cross-correlation function. However, in some implementations described herein, no template is required for the automated cross-correlation methods.

Particle picking is a crucial first step in the computational pipeline of single-particle cryo-EM. Selecting particles from captured micrographs of a solution containing multiple instances of the same type of particle can be difficult—particularly for small particles with low contrast. As high-resolution reconstruction of particles using cryo-EM can require hundreds of thousands of particles, manually identifying particle projections in the micrograph image and manually selecting the particles is impractically time-consuming. Another option might be to select particles from the micrograph image using a semi-automated approach. However, semi-automated approaches may suffer from manual bias in the selection process and may still be prohibitively time consuming. The examples described herein avoid these problems by providing fast, accurate, and fully automatic particle picking. Some of these examples are completely template-free, and employ a kernel support vector machine (SVM) classifier trained on intensity and variance cues for automatic particle identification.

One approach to identifying particle projections in a two-dimensional micrograph image might be to utilize an input template. The peaks of the cross-correlation function (i.e., between the micrograph and the template) indicate locations of particle projections. In contrast, the template-free approaches described in the examples below use an automatically collected training set of windows from the micrograph. The response (in terms of normalized cross-correlation) of any query window with the training set is used in order to classify the content of the query window. Once a set of partially overlapping query windows covering the entire micrograph has been classified, the set of windows most likely to contain a particle projection and the set of windows most likely to contain noise are used to train an SVM classifier. This classifier is then applied to each possible window of the micrograph and provides a classification to the center pixel of each window. In this way, the micrograph is segmented into areas of particles projections and areas of noise. Furthermore, although the examples described below utilize the particle picking technique in a single particle cryo-EM (e.g., separating signal from random noise), the technique can also be applied to a wider range of imaging applications, for example, image denoising.

Unlike template-matching methods, the systems and methods described herein are fully automatic and data adaptive. Behind the idea of cross-correlation methods stands the observation that the cross-correlation function between some input template of the particle and the micrograph is maximized in the presence of a particle with a similar view to the template. If the template image contains noise alone (i.e., contains no particle), the cross-correlation function would not necessarily be maximized in the presence of noise. This means that the content of an image can be discovered from the cross-correlation of this image with a heterogeneous set of windows from the micrograph (or the micrograph itself). An advantage here is that no user input is necessary.

In some implementations, the method begins by finding a set of reference windows in a captured micrograph image. In some implementations, the reference set contains windows of noise and windows of particle projections. The micrograph is divided into containers (i.e., rectangular non-overlapping regions) each containing many different, overlapping n×n windows. Each container is analyzed to identify four n×n windows—the window with the highest mean intensity value, the window with the lowest mean intensity value, the window with the highest variance from the container as a whole, and the window with the lowest variance. The windows with the lower mean intensity and higher variance are generally indicative of windows that contain particle projections while windows with higher mean intensity and lower variance are generally indicative of noise.

A defined number of query images (i.e., windows of size n×n) are then extracted from the micrograph in a way that the query images have some overlap. The normalized cross-correlation function is then computed between each query image and each of the reference windows. In some implementations, for each query image and each reference window, the system will compute the cross-correlation function at each of a plurality of different offsets (e.g., at every possible offset). The system will then normalize by removing the mean of all cross-correlations computed for the query image and the specific reference window. The system then computes the response signal of each query image—the response signal is made of a signal value for each reference window and is the maximum of the normalized cross-correlation between the query image and the reference window. A score is then computed for each query image based on the number of entries of the response signal (e.g., between the query image and each different reference window) that exceed a threshold value. In some implementations, the threshold value is calculated based on the normalized cross-correlation values for several query images or for all query images in the micrograph.

A training set is then selected for the SVM classifier. A particle model is trained using non-overlapping images selected from the highest scoring query images for the micrograph. A noise model is trained using non-overlapping images selected from areas of the micrograph that have relatively low scoring query images. The classifier is trained using the training set for the particle model and the training set for the noise model. Once trained, the classifier is applied to the entire micrograph image to classify each pixel of the micrograph image as either a particle or noise. Particles are then automatically selected from the pixels of the micrograph image classified as particles based, in some implementations, on size of regions of adjacent particle pixels and/or distance from other regions of adjacent particle pixels.

In some implementations, regions of adjacent particle pixels are disregarded if they are too large or too close together. This is done to avoid identifying contaminants as potential particles. However, in other implementations, additional processing steps may be applied to actively identify one or more particular types of contaminants in the micrograph image. Alternatively, after applying the template-free particle picking mechanisms, a template-based particle picking mechanism can be applied to the micrograph using the particles identified in the template-free process as the input templates for the template-based process.

The particle picking problem is the first step towards uncovering the three-dimensional structure of a particle and its possible variability for many biological macromolecules in cryo-EM. Thus, in some implementations, the particle picking processes described herein are integrated into a cryo-EM software package containing other components, such as class averaging, orientation estimation, three-dimensional reconstruction, and refinement. For example, in some implementations, the particles picked from the micrograph are then used for mapping heterogeneous or time-varying objects using low-order moments.

In some implementations, the heterogeneous objects (e.g., a set of objects) can be mapped (up to symmetries) directly from averaged statistics computed from multiple measurements from the picked particles. For example, the system may be configured to calculate a set of statistics for each picked particle from the micrograph and producing an approximation of an object (or heterogeneous objects) and, optionally, a distribution of observed object instances that would have produced approximately the same measurement statistics as the ones measured in each picked particle of the micrograph.

In one embodiment, the invention provides a fully automatic, template-free method for locating and extracting a plurality of two-dimensional projections of particles in a micrograph image. A micrograph image of a sample containing a plurality of particle of a first type is received by an electronic processor, which processes the micrograph image to automatically assemble a set of reference images from the micrograph image. The set of reference images is assembled by analyzing the image data in each of a plurality of partially overlapping windows and identifying a subset of windows with image data satisfying at least one statistic criterion compared to other windows. A cross-correlation is then calculated between the image data in each reference image and the image data in each of a plurality of query image windows. Based on this cross-correlation analysis, a plurality of locations in the micrograph is automatically identified as containing a two-dimensional projection of a different instance of the particle of the first type. In some implementations, the image data from each of these locations is then used to map a three-dimensional model of the particle of the first type.

Other aspects of the invention will become apparent by consideration of the detailed description and accompanying drawings.

BRIEF DESCRIPTION OF THE DRAWINGS

FIG. 14 is a flowchart of a method for mapping an object (such as, for example, a particle) based on a statistical analysis of a plurality of two-dimensional projections of particles identified in a micrograph image using the method of FIG. 2.

FIG. 15 is a flowchart of a method for mapping an object (e.g., a particle) based on a first moment and a second moment determined based on an analysis of a plurality of two-dimensional projections of particles identified in a micrograph image using the method of FIG. 2.

DETAILED DESCRIPTION

Figure 1:
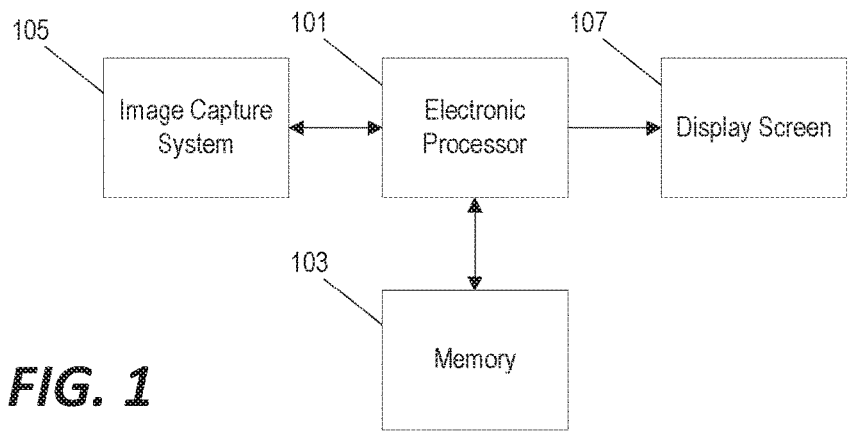
FIG. 1 is a block diagram of an image processing system for picking instances of a particle in a captured image containing two-dimensional projections of multiple instances of the particle, according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Single-particle cryo-electron microscopy (cryo-EM) aims to determine the structure of 3D specimens (e.g., macromolecules) from multiple 2D projections. In order to acquire these 2D projections, a solution containing the macromolecules is frozen in vitreous ice on carbon film, thus creating a sample grid. An electron beam then passes through the ice and the macromolecules frozen within, creating 2D projections of the macromolecules that are captured by an imaging system (e.g., as a micrograph).

Unfortunately, due to radiation damage, only a small number of imaging electrons can be used in the creation of the micrograph. As a result, micrographs have a low signal-to-noise ratio (SNR). Accordingly, each micrograph consists of regions of noise and regions of noisy 2D projections of the macromolecule. In addition to these, micrographs also contain regions of non-significant information stemming from contaminants such as carbon film.

Different types of regions have different typical intensity values. The regions of the micrograph that contain only noise will typically have higher intensity values than other regions. In addition, regions containing a particle typically have higher variance than regions containing noise alone. Due to this, two cues that can be used for projection image identification are the mean and variance of the image.

In order to determine the 3D structure at high resolution, many projection images are needed, often in the hundreds of thousands. Thus, the first step towards 3D reconstruction of macromolecules consists of determining regions of the micrograph that contain a particle as opposed to regions that contain noise or contaminants. This is the particle picking step.

A fully manual selection of hundreds of thousands of 2D projections would be tedious and prohibitively time-consuming. Automatic or semi-automatic approaches might be developed using mechanisms such as edge-detection or template matching. The input to template matching schemes consists of a micrograph and images containing 2D templates to match. These templates can be, for example, manually selected particle projections. The aim is to output the regions in the micrograph that match the templates. The idea behind this approach is that the cross-correlation between a template image and a micrograph is larger in the presence of the template. However, one negative limitations with this method is the high rate of false detection. This issue stems from the fact that given enough random data, meaningless noise can be perceived as a pattern.

In one example of a template-based framework, a user manually selects approximately one thousand particles from a small number of micrographs. These particle images are then 2D classified to generate a smaller number of template images that are used to automatically select particles from all micrographs. These particle images are then classified in order to identify non-particles. In some implementations, the automated analysis can be configured to employ a post-processing step which ensures that the locations of any two picked particles cannot overlap. Alternatively, instead of using templates provided/identified by the user, a system can be configured to utilize predefined templates.

However, in the examples described below, systems are configured to implement a particle picking framework that is fully automatic and data adaptive in the sense that no manual selection is used and no templates are involved. Instead of templates, the system is configured to use a set of automatically selected reference windows. This set includes both particle and noise windows. The system is further configured to determine the presence of a particle in any query image (i.e., a smaller region of the micrograph) through cross-correlation with each window of the automatically defined reference set. Once their content is determined, the query images most likely to contain a particle and those most likely to contain noise can be used to train a classifier. The output of this classifier is used for particle picking.

In some implementations, the formulation described in the examples below ignores the contrast transfer function (CTF), because the particle selection procedure performs on the individual micrograph level by comparing windows taken from the same micrograph. Windows from different micrographs are not compared. Since the CTF is roughly the same throughout the micrograph, its effect can be ignored at this level. In some implementations, the CTF is corrected prior to particle picking, which reduces the support of the individual projections and can aid in differentiating between nearby particle projections. CTF correction also slightly increases contrast of particles relative to background. This correction is done through phase flipping, which does not change noise statistics. Regardless of the specific way the CTF is handled in the particle picking stage, the CTF is not ignored at later stages of the reconstruction pipeline.

FIG. 1 illustrates an example of an imaging system for processing captured micrograph images and automatically identifying two-dimensional projections of particles in the micrograph image. The system includes an electronic processor 101 communicatively coupled to a computer-readable, non-transitory memory 103. The memory 103 stores data (e.g., image data) and instructions that are executed by the electronic processor 101 to provide the functionality of the imaging system—including, for example, the functionality described in the methods below. Although the example of FIG. 1 illustrates only a single electronic processor 101 and a single memory 103, in some implementations, the system may be configured to include multiple electronic processors (e.g., an array of processors of a Graphics Processing Unit (GPU)) and/or multiple different memory modules (either physically incorporated into a housing or remote storage systems).

The electronic processor 101 is also communicatively coupled to an image capture system 105. The image capture system 105 is configured to capture images of a sample containing a plurality of instances of a particle type of particle (e.g., a molecule or macromolecule). In some implementations, the image capture system 105 includes a cryo-EM imaging system configured to capture two-dimensional micrograph images of the sample. In some implementations, the electronic processor 101 is configured to control the operation of the image capture system 105 while, in other implementations, the electronic processor 101 is configured to receive images captured by the image capture system 105 without providing any control. For example, in some implementations, the image capture system 105 is operated independently from the electronic processor 101 and images captured by the image captured system are directly or indirectly transferred to the electronic processor 101 and/or the memory 103 by a user.

The electronic processor 101 is also communicatively coupled to a display screen 107 and is configured to provide image data to the display screen 107 and cause the display screen 107 to output images, data, and, in some implementations, a graphical user interface. As described in further detail below, in some implementations, the electronic processor 101 is configured to cause the display screen 107 to output one or more micrograph images received from the image capture system 105 with annotations and/or other additional information calculated by the electronic processor 101 based on a processing/analysis of the micrograph images.

Figure 2:
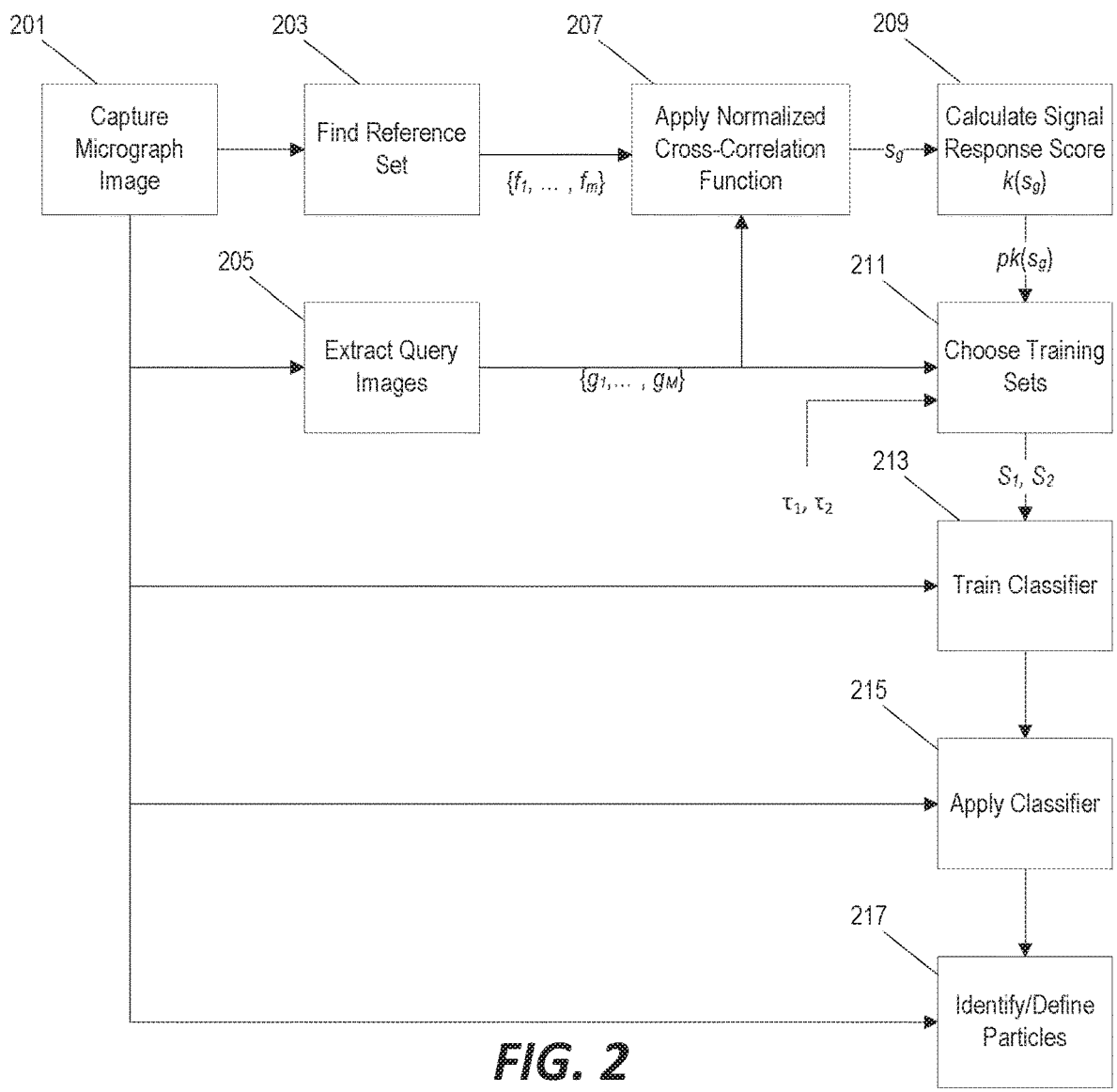
FIG. 2 is a flowchart of a method for identifying two-dimensional projections of multiple instances of a particle in a captured micrograph image using the system of FIG. 1.

FIG. 2 illustrates an example of a method executed by the electronic processor 101 to automatically identify two-dimensional projections of particles in the micrograph image received from the image capture system 105. After a micrograph image is captured (step 201), the electronic processor 101 processes the image to find a reference set (step 203) and to extract query images (step 205) from the micrograph image (as described in further detail below). The electronic processor 101 then applies a normalized cross-correlation function (CCF) between the query images and the reference set (step 207) and, based on the signal responses calculated by the CCF, calculates a signal response score $k(s_g)$ for each query image (step 209). Based on the signal response scores, the electronic processor automatically selects particular query images (e.g., portions of the captured micrograph image) to utilize as training data for a support vector machine (SVM) classifier (step 211). The SVM classifier is trained using the automatically selected training data (step 213) and is then applied to the original micrograph image to produce a binary segmentation image which identifies each pixel in the micrograph image as either a "particle pixel" or a "noise pixel" (step 215). Based on the binary segmentation image, the electronic processor 101 then identifies/defines portions of the image as containing two-dimensional projections of a particle (i.e., "particle picking") (step 217).

Figure 3A:
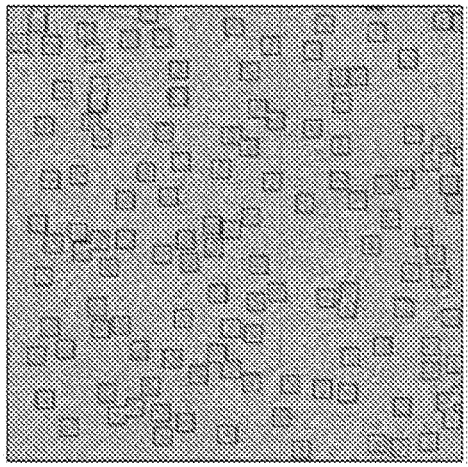
FIG. 3A is a β-Galactosidase micrograph image including two-dimensional projections of multiple instances of a type of particle.
Figure 3B:
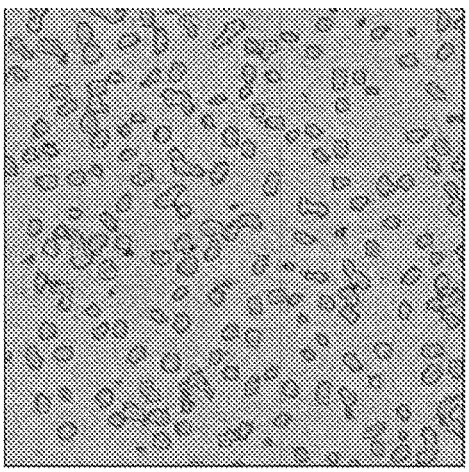
FIG. 3B is an intermediate output of the method of FIG. 2 applied to the micrograph image of FIG. 3A identifying pixels in the micrograph image of FIG. 3A classified as part of a particle.
Figure 3C:
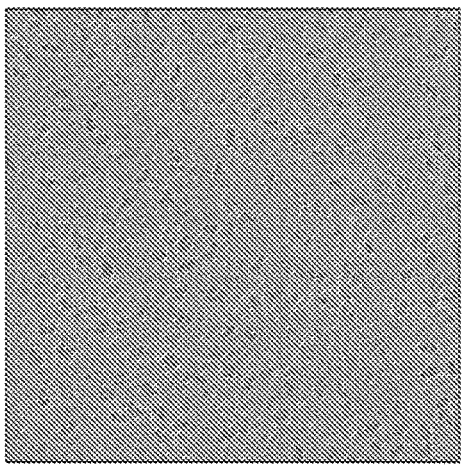
FIG. 3C is the output of the particle picker of the method of FIG. 2 applied to the micrograph image of FIG. 3A indicating particles that are automatically identified in the micrograph image of FIG. 3A.

FIGS. 3A, 3B, and 3C illustrate a first example of the particle picking method of FIG. 2 applied to a captured micrograph image. FIG. 3A illustrates an example of a micrograph image captured of a sample that includes multiple β-Galactosidase molecules. FIG. 3B illustrates an example of the binary segmentation image output by the SVM classifier of the method of FIG. 2 which identifies each pixel of the micrograph image as a "particle pixel" or a "noise pixel." FIG. 3C illustrates a square box positioned around each two-dimensional projection of a particle as determined automatically by the electronic processor 101 based on the binary segmentation image of FIG. 3B.

Figure 4A:
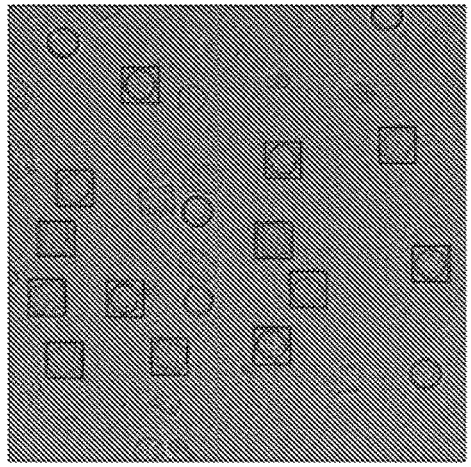
FIG. 4A is a KLH micrograph image including two-dimensional projections of multiple instances of a type of particle.
Figure 4B:
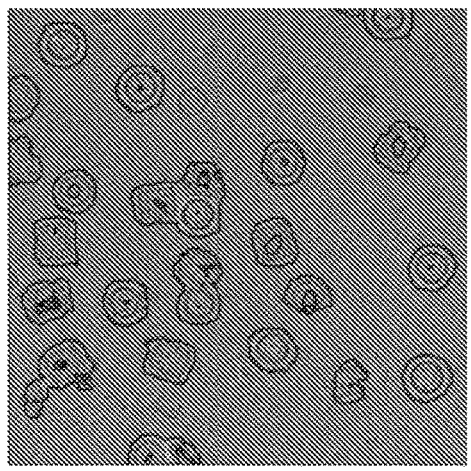
FIG. 4B is an intermediate output of the method of FIG. 2 applied to the micrograph image of FIG. 4A identifying pixels in the micrograph image of FIG. 4A classified as part of a particle.
Figure 4C:
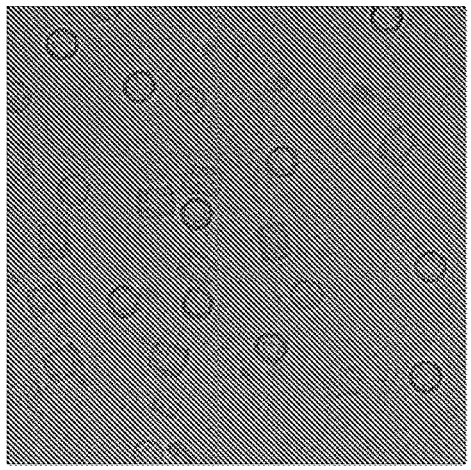
FIG. 4C is the output of the particle picker of the method of FIG. 2 applied to the micrograph image of FIG. 4A indicating particles that are automatically identified in the micrograph image of FIG. 4A.

FIGS. 4A, 4B, and 4C illustrate another example of the particle picking method of FIG. 2 applied to a captured micrograph image. FIG. 4A illustrates an example of a micrograph image captured of a sample that includes multiple KLH particles. FIG. 4B illustrates the binary segmentation image output by the SVM classifier of the method of FIG. 2 and FIG. 4C illustrates a square box positioned around each two-dimensional projection of a particle as determined automatically by the electronic processor based on the binary segmentation image of FIG. 4B.

Figure 5:
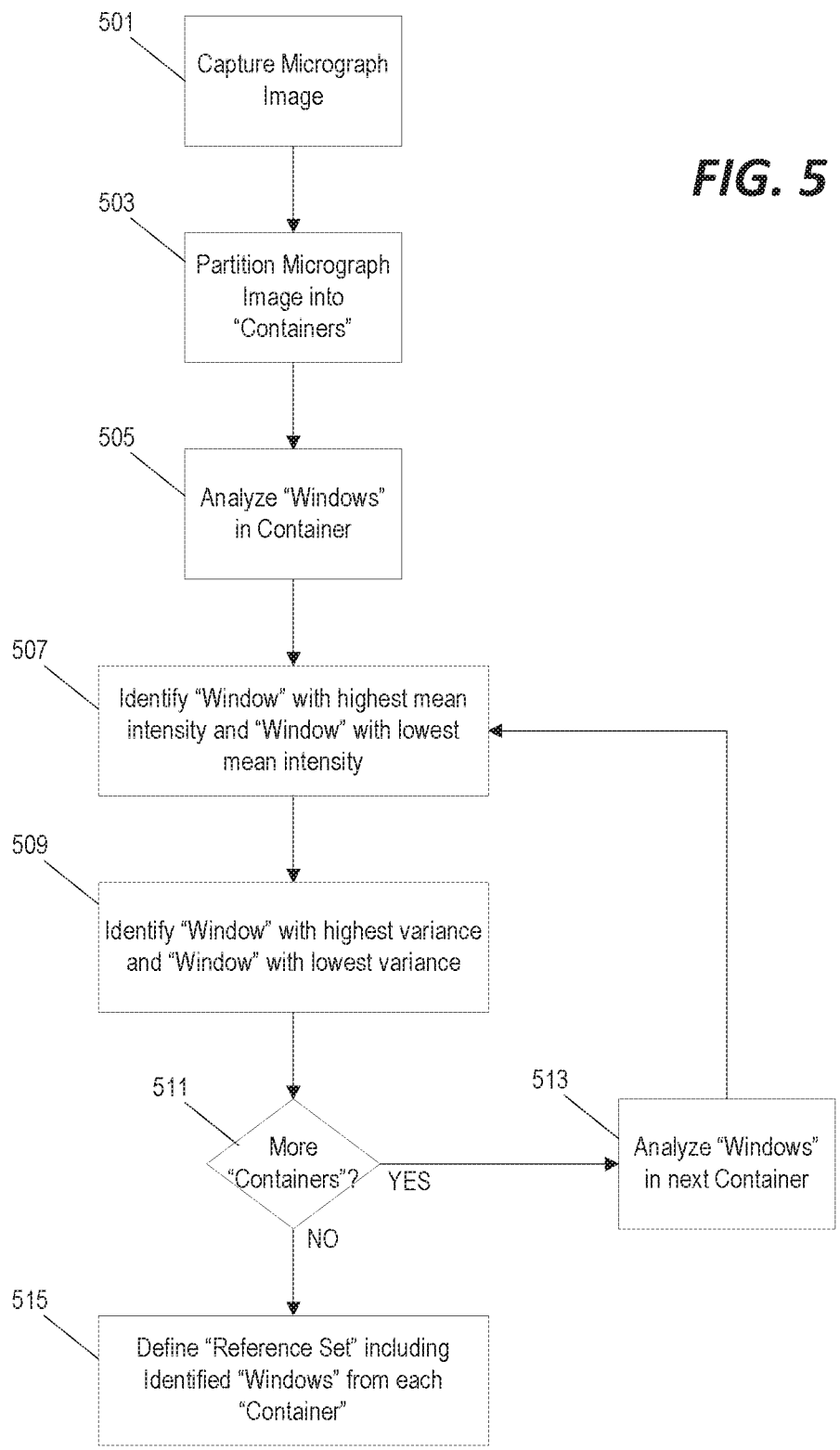
FIG. 5 is a flowchart of a method for identifying a reference set in a micrograph image for use in the method of FIG. 2.

FIGS. 5-13C illustrate more detailed examples of various steps of the automatic, template-free particle picking method of FIG. 2. In particular, FIG. 5 illustrates a method for defining a set of reference images that will be used with the query images in the cross-correlation analysis. The set of reference images $\{f_m\}_{m=1}^{B}$ need not contain all possible windows in the micrograph. This would lead to unnecessarily long runtimes. Instead, in the example of FIG. 5, a subset of B windows is selected from the micrograph. Each of these selected windows is either likely to contain a particle or likely to contain noise alone, while some windows can also contain carbon, ice crystals, or other contaminants. Overall the selected windows consist of a fair amount of windows containing particles and a fair amount of windows containing noise.

Figure 6A:
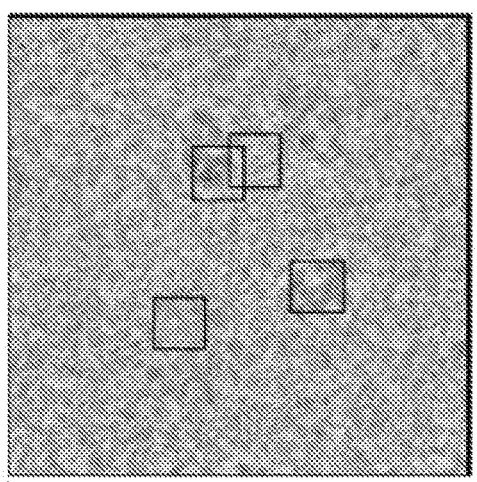
FIG. 6A is an example of a micrograph image divided into multiple containers according to the method of FIG. 5.

In order to automatically select this subset, a micrograph image is captured and received by the system (step 501) and divided into B/4 non-overlapping "containers." A container is some square or rectangular portion of the micrograph. Each container holds many n×n windows. FIG. 6A illustrates an example of a micrograph divided into containers. Each individual container is then analyzed to identify a defined number of n×n windows within the container that will be used as part of the reference set (step 505). Each window of a plurality of partially overlapping n×n window is separately analyzed to determine whether to use the window as a part of the reference set.

Figure 6B:
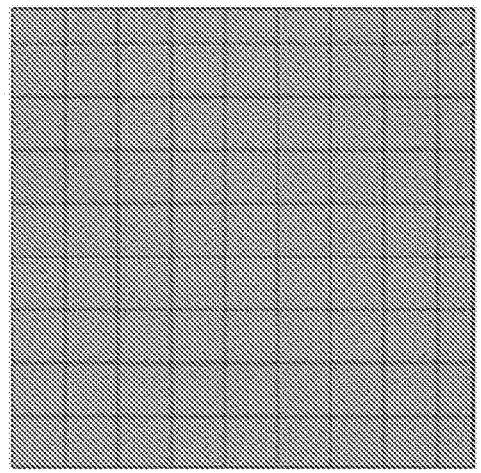
FIG. 6B is an example of four reference images identified in a single container of the micrograph image of FIG. 6A according to the method of FIG. 5.

The particular analysis applied to the windows or the conditions that cause a particular window to be selected as part of the reference set may vary in different implementations. However, in the example of FIG. 5, the electronic processor computes a mean intensity and a variance for each window within each particular container. As discussed above, regions containing noisy projections of particles typically have lower intensity values and higher variance than regions containing noise alone. Thus, the window with the lowest mean intensity in each container likely contains a particle and the window with the highest mean intensity likely does not. Similarly, the window with the highest variance in each container likely contains a particle and the window with the lowest variance likely does not. Accordingly, the method of FIG. 5 is configured to identify in each individual container the window with the highest mean intensity and the window with the lowest mean intensity (step 507). The method also identifies the window with the highest variance and the window with the lowest variance (step 509). FIG. 6B illustrates an example of a single container with the four "windows" identified in steps 507 and 509.

This process is repeated for each container in the micrograph until four reference images (i.e., four windows) have been identified in each container (steps 511 and 513). Once each container has been analyzed/processed, a "reference set" is defined that includes the four "windows" that were identified in each "container" of the micrograph (step 515).

In some implementations (such as in the example of FIG. 5), the set of reference windows is configured to contain both windows with noise and windows with particles. For roughly symmetric particles (i.e. particles with similar projections from each angle), any query image will have a similar response to every reference image which contains a particle. Thus, if noise images were not included in the reference set, the response signal $s_g$ would be uniform regardless of the content of g.

Figure 7:
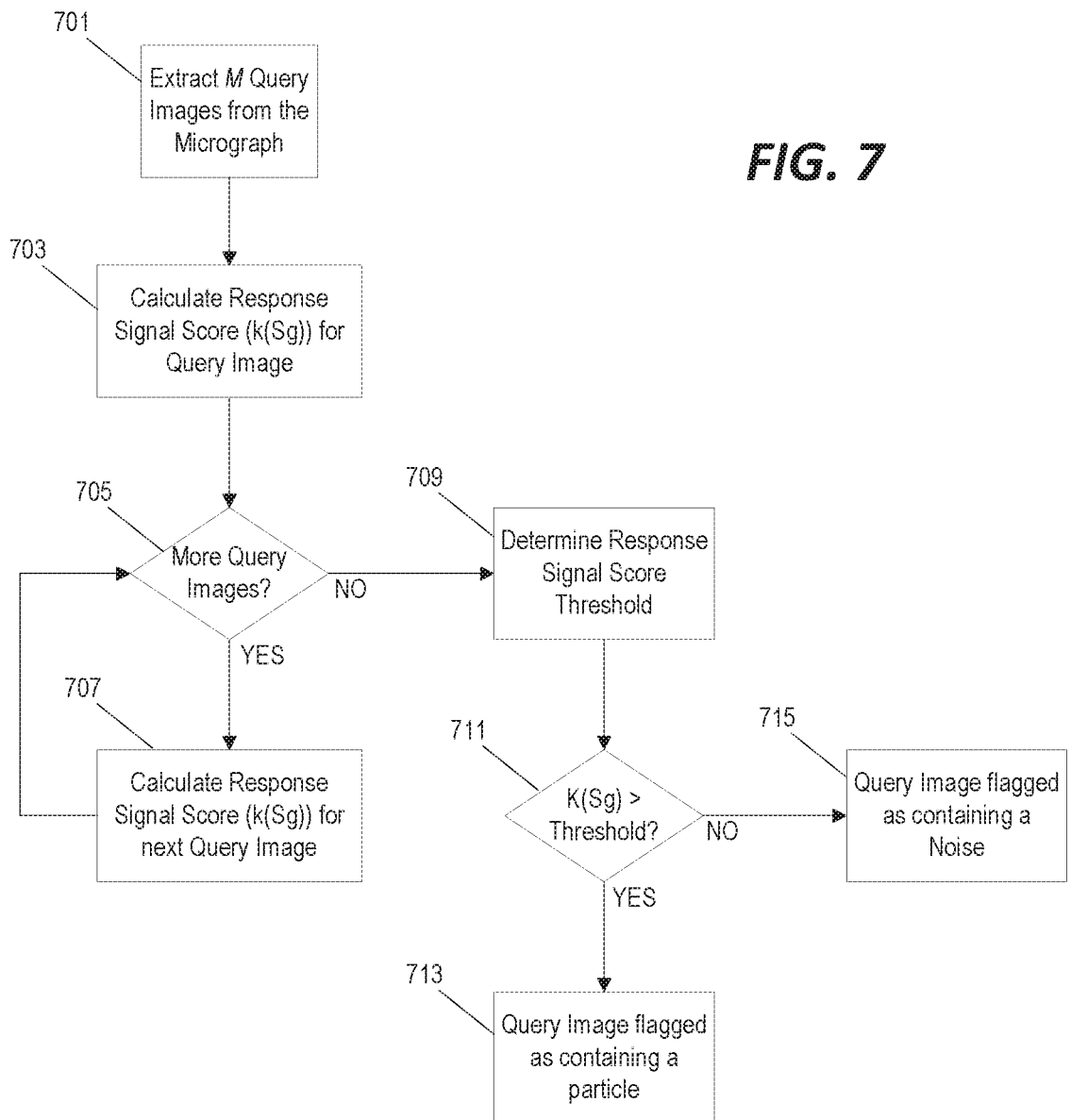
FIG. 7 is a flowchart of a method for calculating a response signal score $k(s_g)$ for each of a plurality of query images extracted from the micrograph image using the reference set identified in the method of FIG. 5 for use in the method of FIG. 2.

After the reference set is defined (using the method of FIG. 5), the micrograph is divided into a plurality of query images and a cross-correlation analysis is applied between each query image and each reference image. As illustrated in the example of FIG. 7, the system is configured to extract a set of M query images from the micrograph. Each query image g is defined to be of the same size (e.g., n×n where n is chosen such that the particle size is slightly larger than the window). The query images are defined to have some overlap. In addition, the set of query images together should span the entire micrograph. This practice improves the likelihood of some query images containing noise while others contain a particle. The system is configured to then calculate a response signal score $k(s_g)$ for each query image (step 703). The calculation of the response signal score is based on an application of a normalized cross-correlation function with each reference image for an individual query image.

The cross-correlation function (CCF) is defined by the equation:

$$c_{f_m,g}(x,y) = \sum_x \sum_y f_m(x',y') g(x+x', y+y') \quad (1)$$

This function can be thought of as a score associated with $f_m$, g, and an offset (x,y). The cross-correlation score at a certain offset does not in itself have much meaning without the context of the score in nearby offsets. For this reason, we define the following normalization on the cross-correlation function:

$$\hat{c}_{f_m,g}(x,y) = c_{f_m,g}(x,y) - \frac{1}{n^2} \sum_{x'} \sum_{y'} c_{f_m,g}(x', y') \quad (2)$$

We call this a normalization since it shifts all cross-correlations to a common baseline.

Consider the case where query image g contains a particle. The score $c_{f_m,g}(x, y)$ is expected to be maximized when $f_m$ contains a particle with a similar view. In this case there will be some offset (x,y) such that the images $f_m$ and g match best, and $c_{f_m,g}(x, y) \geq c_{f_m,g}(x', y')$ for all other offsets (x',y'). Thus, $$c_{f_m,g}(x, y) > \frac{1}{n^2} \sum_{x'} \sum_{y'} c_{f_m,g}(x', y') \quad (3)$$

In other words, $\hat{c}_{f_m,g}(x,y)$ is expected to be large and positive. In this case, we say g has a strong response to $f_m$.

Next, consider the case where query image g contains no particle. In this case, there should not exist any offset (x,y) that greatly increases the match for any $f_m$. Thus, typically $\hat{c}_{f_m,g}(x, y)$ is comparatively small in magnitude. In other words, g has a weak response to $f_m$.

In this example, we define a response signal $s_g$ such that:

$$s_g(m) = \max_{x,y} \hat{c}_{f_m,g}(x,y), m=1, \ldots, B \quad (4)$$

Figure 8A:
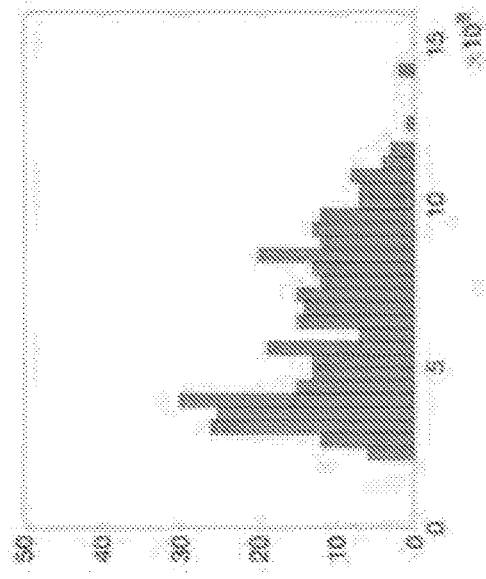
FIG. 8A is a graph of the response signal of a query image including at least a portion of a particle.
Figure 8B:
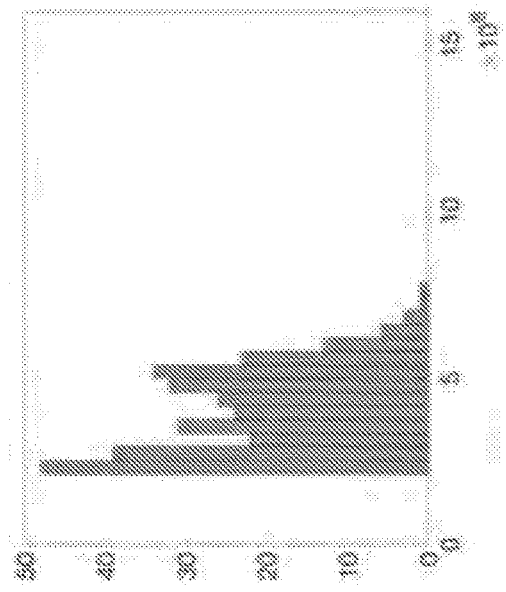
FIG. 8B is a histogram of the response signal of FIG. 8A.
Figure 9A:
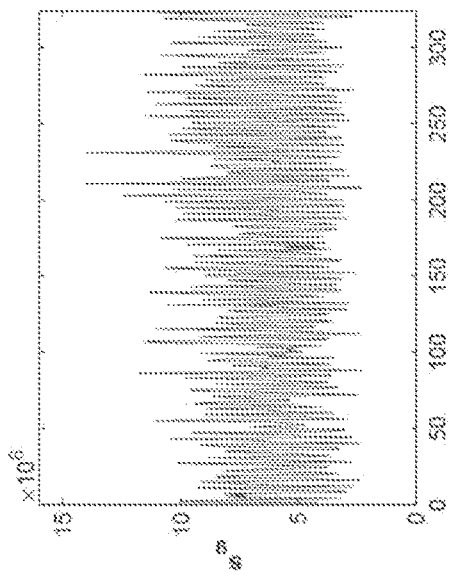
FIG. 9A is a graph of a response signal of a query image that does not include at least a portion of a particle.
Figure 9B:
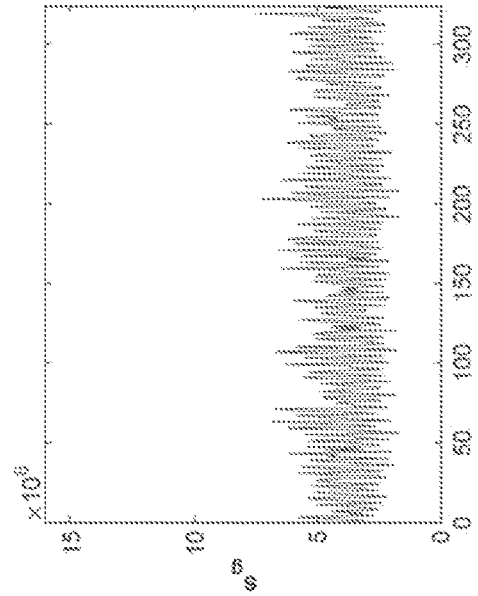
FIG. 9B is a histogram of the response signal of FIG. 9A.

The response signal defined in equation (4) is associated with a single query image g. Each entry of the response signal contains the maximal normalized cross-correlation with a single reference image. Thus, the response signal captures the strength of the response of the query image to each of the reference images. $s_g$ can be used to determine the content of g. If the query image contains a particle, $s_g$ will show a high response to reference images containing a particle with similar view and a comparatively low response to other reference images. As a consequence, $s_g$ will have several high peaks. On the other hand, if the query image contains noise alone, $s_g$ will have relatively uniform content. This is demonstrated in FIGS. 8A through 9B. FIG. 8A is a graph of the response signal of a query image containing a particle (FIG. 8B is a histogram of the response signal of FIG. 8A). FIG. 9A is a graph of the response signal of a query image that does not contain a particle (FIG. 9B is a histogram of the response signal of FIG. 9A). The response signal of FIG. 8A demonstrates several high peaks while the response signal of FIG. 9A is more uniform/flat.

This is true despite the high rate of false positives in cross-correlation-based methods. Indeed, it is possible that a query image $g_1$ containing a particle will have a strong response to a reference window that does not contain a particle with similar view. However, for the majority of reference windows, this will not be the case and thus $s_g$ will remain non-uniform. Furthermore, it is possible that some query image $g_2$ that contains no particle may have a strong response to some reference images $f_m$. However, there will not be many such reference images. As a result of this, the response signal will still be relatively uniform as expected.

Returning now to the example of FIG. 7, in order to determine the content of each query image g, the system is configured to examine the number of entries that are over a certain threshold using the equation:

$$k(s_g) = |\{i \text{ such that } s_g(i) > t\}| \quad (5)$$

where the threshold t is determined according to the set of response signals and is experimentally set to $$t = \frac{\max_{g,i} s_g(i) - \min_{g,j} s_g(j)}{20} + \min_{g,j} s_g(j) \quad (6)$$

Any query image g that possesses high $k(s_g)$ is known to have had a relatively strong response to a large amount of reference windows and is thus expected to contain a particle. On the other hand, a query image g that possesses low $k(s_g)$ is expected to contain noise. In this manner, the system is configured to consider $k(s_g)$ as a score for query window g. The higher this score, the more confident we can be that g contains a particle.

In at least some implementations, this score is useful only because the system is configured to examine a set of query images that spans the entire micrograph. Instead of checking the uniformity of the response signal for a single query image, the system is configured to use the response signals of the entire set to determine a threshold above which we consider a response to be strong. Due to this, in some implementations, there is no strict necessity to include windows of noise in the reference set.

Returning again to FIG. 7, after a response signal score $k(s_g)$ is calculated for a first query image (step 703), the process is repeated for each query image (steps 705, 707) until a score has been calculated for each query image. In some implementations (as illustrated in FIG. 7), a response signal threshold score might be determined (step 709) to differentiate between query images corresponding to particles and query images corresponding to noise. If the score for a particle query image is greater than the threshold (step 711), the query image can be flagged as containing a particle (step 713). Conversely, if the score is below the threshold, then the query image can be flagged as containing noise (step 715).

Figure 10:
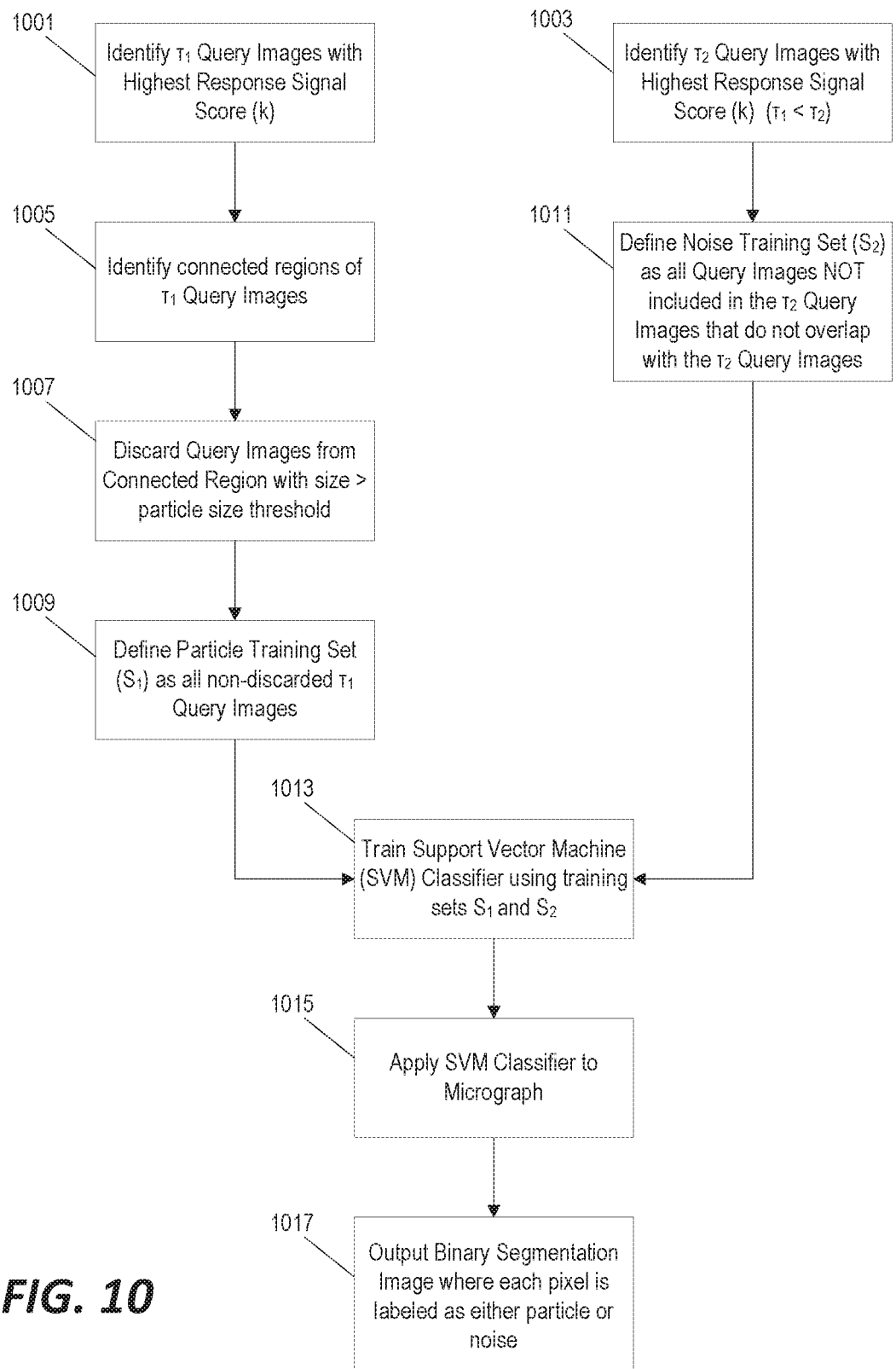
FIG. 10 is a flowchart of a method for classifying each pixel of a micrograph image as either a particle pixel or a noise pixel for use in the method of FIG. 2.

However, in other implementations, the relative scores for each query image are used to identify sets of training data that will be used to train the SVM classifier as further illustrated in the example of FIG. 10. The system is configured to define the sets of training data as including query images whose classification (as particle or noise) is given with high confidence. If the set of query images is denoted as $\{h_m\}_{m=1}^c$ and we further denote the set of images used to train the particle and noise models as $S_1$ and $S_2$, respectively. The training set is $S_1 \cup S_2$.

The choice of $S_1$ and $S_2$ depends on two parameters, $\tau_1$ and $\tau_2$. These parameters define the number of training images that are believed to include particle ($\tau_1$) and the number of training images that may contain a particle ($\tau_2$). The $\tau_1$ query images with the highest response signal score k are identified (step 1001). These query images will together form a plurality of connected regions in the micrograph (step 1005) that will be used to extract the training set $S_1$. Regions of the micrograph that contain artifacts are expected to be sized differently compared to an individual particle. Therefore, the system in the example of FIG. 10 is configured to use size as a cue to differentiate between artifact regions and particle regions. In order to avoid including image data containing artifacts in our training data set, the system is configured to determine a size (e.g., a total number of pixels) in each connected region of the $\tau_1$ query images and to discard query images from connected regions with a size that is greater than a defined particle size threshold (step 1007). The Training Set for a particle model will be defined based on all non-discarded images of the $\tau_1$ query images (step 1009).

In order to identify a set of training data $S_2$ for the noise model, the system is configured to identify the $\tau_2$ query images with the highest response signal score k (step 1003). The number $\tau_2$ is defined as a number greater than $\tau_1$ and, therefore, the number of query images selected in step 1003 will be larger than the number of query images selected in step 1001. Accordingly, the query images selected in step 1003 will include all of the query images that the system determines with high confidence include a particle and additional query images that the system determines with lower confidence may include a particle. In turn, the query images that were NOT selected in step 1003 include a subset of query images that have a low response signal score and are determined by the system to likely include pure noise. The set of training data $S_2$ that will be used to train the noise model is extracted from the set of all query images NOT included in the $\tau_2$ query images that do not overlap with the $\tau_2$ query images (step 1011).

Figure 11C:
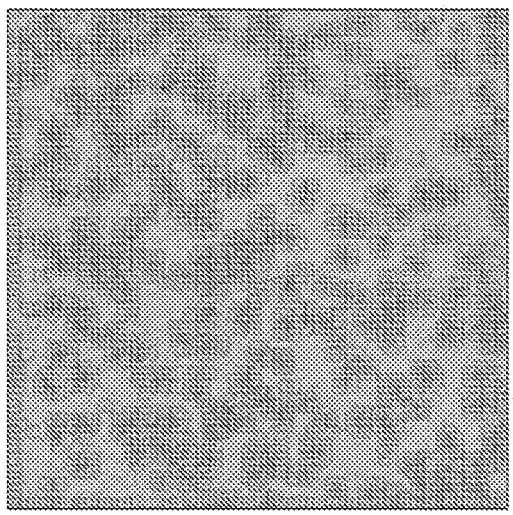
FIG. 11C is the micrograph image of FIG. 11A identifying query images with a high or intermediate responses signal score—the complement of which is used to determine a set of training data for training a noise model in the method of FIG. 10.
Figure 11B:
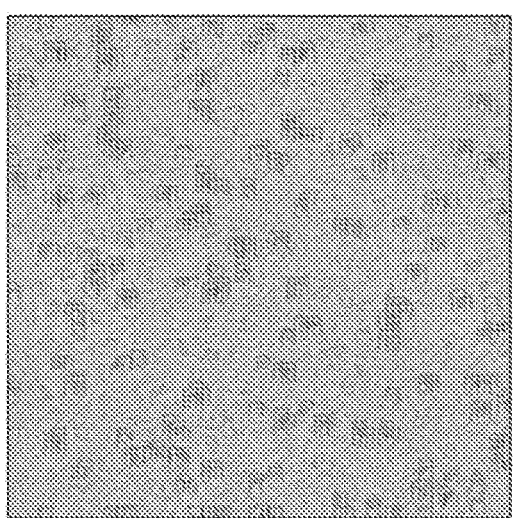
FIG. 11B is the micrograph image of FIG. 11A identifying query images with a high response signal score used to determine a set of training data for training a particle model in the method of FIG. 10.
Figure 11A:
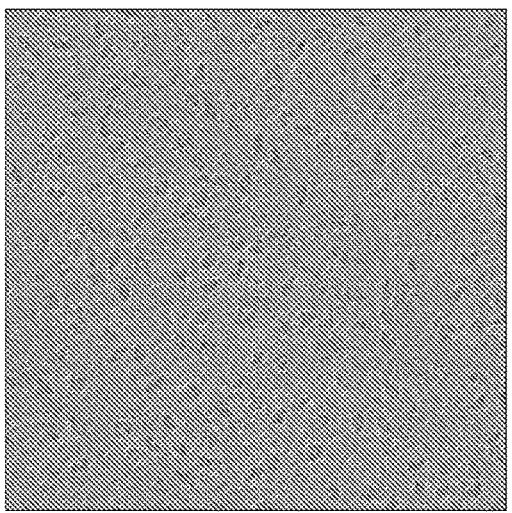
FIG. 11A is another example of a micrograph image including two-dimensional projections of multiple instances of the same type of particle.

FIG. 11A illustrates an example of a micrograph image. FIG. 11B shows the windows of the query images that have been identified as having the $\tau_1$ highest k scores in the micrograph of FIG. 11A, which will be used to extract the training data for the particle model of the SVM classifier. Finally, FIG. 11C shows the windows of the query images that have been identified as having the $\tau_2$ highest k scores in the micrograph of FIG. 11A, which will be used to extract the training data for the noise model of the SVM classifier.

In some implementations, the selection of $\tau_1$ and $\tau_2$ is made according to the concentration of the macromolecule in the sample (i.e., the number of particle projected in the micrograph). When the concentration is low, there are fewer particle projections in the micrograph. As a result, there are less query images that the system can determine with reasonable certainty to contain a particle. On the other hand, if the concentration is high, there will be more particle projections in the micrograph and there will be more query images that can be confidently determined to contain a particle.

For example, consider a micrograph with M=20000 query images. If it is known that there are many projected particles, we can assume, for example, that 1000 query images with the highest k score will contain a particle. Thus, $\tau_1$ can be set to equal 1000. In addition, when the micrograph is known to contain many projected particles, it is possible that out of the 20000 query images, 15000 may contain some portion of a particle. Therefore, we can assume that the regions of the micrograph that are not contained in any of the $\tau_2$=15000 images with the highest k score will be regions of noise. In some implementations, in situations where the concentration of macromolecules is not high, the value of $\tau_2$ is less important than that of $\tau_1$.

The training set for the SVM classifier will consist of vectors $x_1, \ldots, x_{|S_1 \cup S_2|} \in \mathbb{R}_+^2$ and labels $y_1, \ldots, y_{|S_1 \cup S_2|} \in \{0, 1\}$. Each vector $x_i$ in the training set contains the mean and variance of a window $h_i \in S_1 \cup S_2$, and is associated with a label $y_i$, where $$y_i = \begin{cases} 1, & \text{if } h_i \in S_1 \\ 0, & \text{if } h_i \in S_2 \end{cases} \quad (7)$$

The training set is used to train a support vector machine (SVM) classifier (step 1013). In some implementations, the system is configured to use a Gaussian radial basis function (RBF) SVM. Once the classifier is trained, the classifier is applied to the entire micrograph to obtain a prediction for every possible window of size n×n in the micrograph (step 1015). The classification is attributed to the central pixel of each window and provides a segmentation of the micrograph to particle pixels and noise pixels. The output of the classifier is a binary image (i.e., a binary segmentation image) where each pixel is labeled as either a particle pixel or a noise pixel (step 1017).

Figure 12:
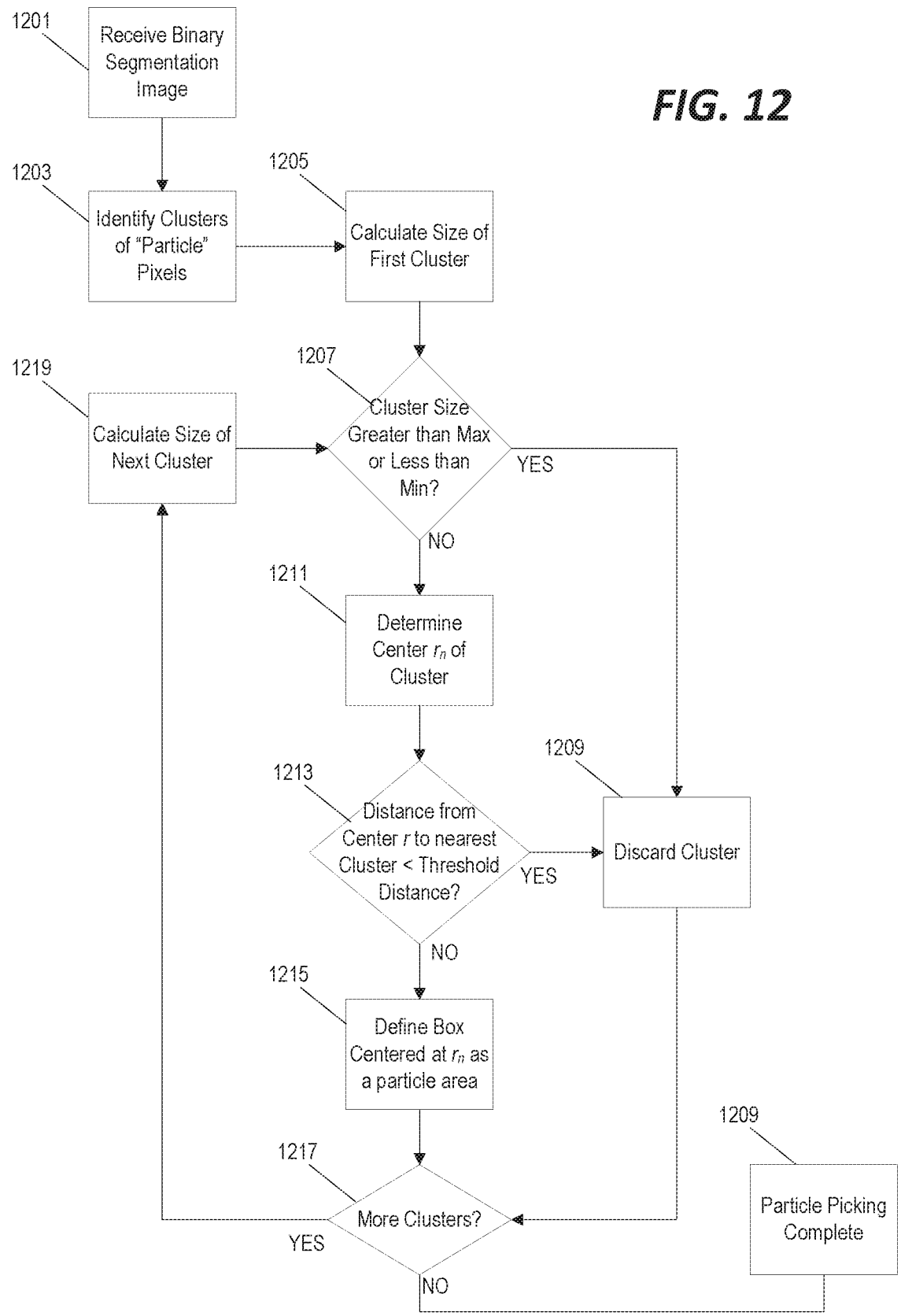
FIG. 12 is a flowchart of a method for identifying (i.e., "picking") particles from the micrograph image using the binary segmentation image of the micrograph generated by the method of FIG. 10 for use in the method of FIG. 2.

Once the SVM classifier has been trained and applied to the micrograph image to generate the binary segmentation image, a final particle picking routine is applied to the segmented micrograph image. One example of this final particle picking routine is illustrated in FIG. 12. The binary segmentation image is received (step 1201) and clusters of "particle" pixels are identified (step 1203). Each connected region/cluster of particle pixels may contain a particle. On the other hand, it may also contain some artifact. Thus, the system in this example is configured to disregard clusters that are too small or too big. This can be done by calculating a size of the cluster (e.g., the total number of pixels in the cluster) (step 1205) and comparing the size to a maximum size threshold and a minimum size threshold (step 1207). If the size of the cluster is greater than the maximum size threshold or less than the minimum size threshold, then the cluster is discarded (step 1209) and will not be flagged as one of the "picked particles" in the micrograph.

Alternatively, this can be done through use of morphological operations. An erosion is a morphological operation preformed on a binary image wherein pixels from each cluster are removed. The pixels to be removed are determined by proximity to the cluster boundary. In this way, the erosion operation shrinks the clusters of a binary image. This shrinkage can be used to determine the clusters that contain artifacts. Large artifacts will remain when shrinking by a factor larger than the particle size. Small artifacts will disappear when shrinking by a factor smaller than the particle size.

It is also possible that two particles may be frozen very close together. Because this will also distort the true particle projection, particles that are too close together are also disregarding. As illustrated in FIG. 12, the system is configured to determine a center r, of the cluster (step 1211) and to determine a distance between the center of the cluster and the nearest other cluster. If the distance between the center of the cluster and another cluster is less than a threshold distance (step 1213), both clusters are discarded (step 1209). However, if a particular cluster passes both the size and distance tests, the particle is "picked" and its location in the micrograph is indicated by a box that is defined around the center of the cluster (step 1215). In some implementations, the size of the box is determined according to the known (or hypothesized) size of the particle. The pixel content of the defined box is a particle "picked" by the method of FIG. 12. These steps are repeated until all clusters in the micrograph have been analyzed. In some other implementations, once a plurality of particles are "picked" by the method of FIG. 12, a template-based particle picking algorithm is applied to the original micrograph image using the "picked" particles from FIG. 12 as the input templates.

Figure 13C:
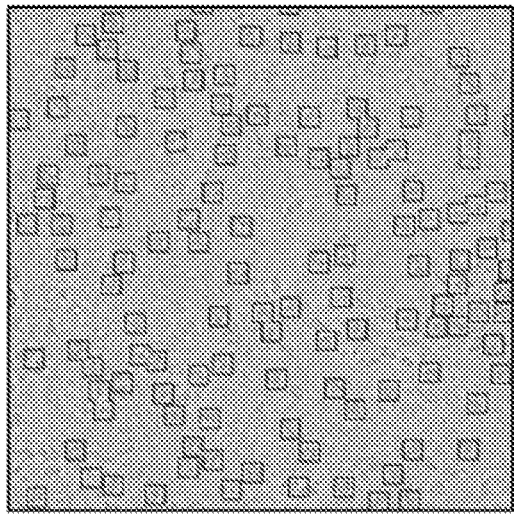
FIG. 13C is the micrograph of FIG. 13A further illustrating two-dimensional projections of particles that have been automatically identified in the micrograph of FIG. 13A using the method of FIG. 12.
Figure 13B:
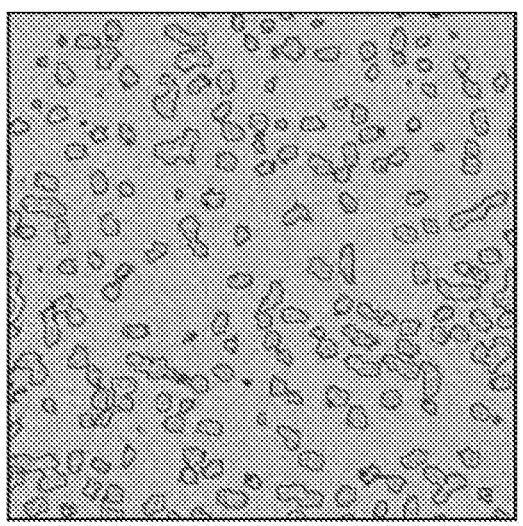
FIG. 13B is a binary segmentation image of the micrograph of FIG. 13A produced by the method of FIG. 10.
Figure 13A:
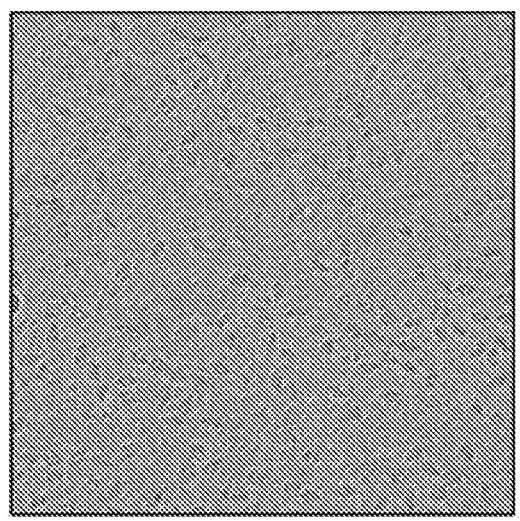
FIG. 13A is still another example of a micrograph image.

FIGS. 13A, 13B, and 13C illustrate yet another example of the method of FIGS. 10 and 12. FIG. 13A illustrates an example of a micrograph image. FIG. 13B illustrates an example of a binary segmentation image produced by the method of FIG. 10. FIG. 13C illustrates an example of the final output of the method of FIG. 12 defining a plurality of "picked" particles.

As noted above, in some implementations, the set of two-dimensional projections of the particles that are identified in a micrograph image using the systems and methods described above may be used to map the particle (e.g., to generate a 3D digital model of the particle). One example of heterogeneous objects are molecules which can appear in one of many (possibly a continuum) of conformations. Each measurement (e.g., the two-dimensional projection of each picked particle) is a (possibly noisy and distorted) record of one instance of the object (of the many possible instances) after one of a set of operations (such as a rotation of the molecule and its projection to a two-dimensional image) has been applied to it. For instance, in some applications, each measurement is a projection of a different physical molecule (each molecule being an instance of a possibly different conformation), which is observed in an unknown rotation orientation (with additional measurement distortions and noise). In some cases, some of the parameters of the operations and distortions are known. For example, in cryo-EM, each image is distorted by a filter that is approximately known, but the rotation of the molecule in each particular image (e.g., picked particle) is unknown. The set of possible operations is assumed to be known (e.g., the set of the operations of all possible rotations in any angle, followed by a two-dimensional projection). However, the specific operation applied in each measurement (for example, the particular rotation applied before the projection) is unknown. The distribution of object instances (out of the set of possible objects) is either to be known approximately (typically, uniform) or it is estimated by the algorithm (up to symmetries for the object distributions).

In the cryo-EM example, the measurements (e.g., each picked particle from the micrograph) are images of different molecules which are captured in a thin layer of ice in different orientations (often many of them are recorded in the same micrograph, and with additional distortions). In some cases, it is convenient to describe the measurements as if they are measurements of the same object which is rotated in each measurement.

In some implementations, a system and/or method is configured to use statistics, such as lower order moments, in order to estimate the objects or heterogeneous objects and, optionally, the distribution of object instances (up to symmetries) directly from the statistics, without estimating the unknown operation applied in each measurement and without estimating the heterogeneous instance of each measurement. In some implementations, these statistics are functions of the objects or heterogeneous objects and the distributions of the object instances, derived based on a model of the measurement procedure.

In some implementations, the methods and systems for estimating the objects require only one pass over the data and can be applied in a streaming fashion without even storing all the data. Some other implementations of the method can be configured to use additional passes, for example, to refine the results or to improve the preprocessing of data.

In some implementations, the system is configured to construct the estimates by producing an approximation of objects or heterogeneous objects and, optionally, the distribution of observed object instances that would have produced approximately the same measurement statistics as the ones measured in practice (i.e., from the picked particles of the micrograph). Optionally, statistics may be used that are invariant to certain operations of choice, as needed in the application. For example, products of Fourier coefficients that are invariant to certain group operations (or, equivalently, statistics over products of values at points in the spatial domain, averaged over a group, such as the averaging over translations) up to some numerical accuracy. In particular, such statistics may be utilized in the multi-reference alignment (MRA) problem, where features that are invariant to the translation of the measured signals are used.

In some implementations, the method is employed in cryo-electron microscopy (Cryo-EM) and x-ray free electron lasers (XFEL) for tasks known as two-dimensional and three-dimensional classification. Three-dimensional classification is a term commonly used in the area of cryo-EM to describe a plurality of methods and applications for mapping heterogeneous structures. Among other processes covered by the term in this area, it encompasses methods that assign images to different classes (either uniquely or a "soft" assignment), where each class refers to a different structure/object instance of the heterogeneous object. It is typically followed by a procedure that recovers a homogeneous structure for each class. The term also refers, implicitly, to other methods of mapping heterogeneous objects, including direct mapping from the statistics described here, and using the statistics described here to recover signatures (an approximate mapping of the objects, or other statistics of the objects) that allow to assign classes to the original images (which would typically be followed by a refinement procedure). By extension, the term refers to analogous procedures applied in other areas.

Two-dimensional classification is a term commonly used in the area of cryo-EM to describe a plurality of methods and applications for obtaining pseudo-measurements that are considered less distorted than the original measurements. Among other processes covered by the term in this area, it encompasses collecting images that are roughly similar (up to in-plane rotation and certain distortions) and averaging them, or, more generally, combining them to obtain better normalized pseudo-images, for example by augmenting the information that different images provide about different frequencies (e.g., "class averaging"). This term also covers the clustering images that are "similar" (are associated with a similar orientation and heterogeneity instance), which is an operation that is typically a part of the process of obtaining the pseudo-measurements, such as the one embodiment of the disclosed method of obtaining pseudo-images that are a set of images that would have yielded similar statistics to the statistics of the measurement. These pseudo-images can be used directly for the mapping of the object (by any method of mapping an object from images, with or without additional images), or as "templates" that aid in the clustering of other images for class averaging or other processing.

In two-dimensional classification, the pseudo-images themselves are the "heterogeneous object," because a homogeneous object yields a set of different pseudo-images, each pseudo-image representing the output of one of an applied operation, such as projecting from a different viewing orientation. By extension, all the references herein to an object also apply to the case of heterogeneous objects (so that each pseudo-image is associated, approximately, with a specific object instance and specific orientation). The method retrieves sets of such approximate pseudo-images with the goal of having each pseudo-image implicitly associated with some unknown rotation and heterogeneity instance. By extension, the term two-dimensional classification also refers to analogous procedures applied in other areas.

For the examples describing mapping and 3D modeling of objects, references herein to particles and heterogeneous particles, and to the set of operations applied to them, can be extended to also cover the distribution of applied operations. Some of the statistics that can be computed from the measurements are functions of both the object/heterogeneous object and of the distribution of applied operations. For example, the expectation of the moments computed from images in cryo-EM (typically, statistics that are independent of in-plane rotation) depends on the object/hyper object, the distribution of heterogeneous objects instances and the distribution of viewing orientations (typically up to in-plane rotations). The disclosed method is extended to recover the object/heterogeneous object by extending all the expansions to include the distribution of applied operations (optionally, a joint distribution of object instances and of applied operations). Furthermore, the disclosed method applies to the case of non-heterogeneous objects, where the statistics are a function of the distribution of applied operations that have not been treated in previous work (for example, the covariance and bi-spectrum in cryo-EM are handled only for the case of uniform distributions of rotations, and the disclosed method extends this to cases of non-uniform distribution of rotations).

Not all statistics are a function of the distribution. For example, the computed moments may be chosen so that they are invariant to translations of the object, making them invariant to the distribution of applied shifts. Other statistics of the signals in MRA are a function of the distributions of translations. In some applications, the distributions of operations are assumed to be approximately uniform, yielding simpler expressions. The disclosed method involves the estimation of objects and/or heterogeneous objects, the distribution of heterogeneous object instances (when applicable), and is extended to the estimation of the distribution of applied operations (up to symmetries), whether the distributions of applied operation is actually computed in practice or used just for the purpose of computing other variables.

The disclosed method can be used for a plurality of scientific or engineering applications that solve an inverse problem in which unknown operations (out of a set that is known approximately) are applied on instances of a set of unknown objects, where the application is to estimate the set of objects. In particular, the method is of interest in cryo-EM and XFEL, where the viewing directions of the objects under examination are unknown. Another application is Computerized Tomography (CT) with heterogeneous and/or moving and/or time-varying objects. For example, the changes in an imaged human body that occur as the subject breathes or moves in the machine is a source of heterogeneity in measurements. It is likely that this method will be applicable to additional imaging techniques.

Many of the existing methods in cryo-EM require a good initial estimate of the object (possibly a low-resolution estimation) in order to yield satisfactory results. The disclosed method provides initial estimates that can be further refined by existing methods.

One specific prospective cryo-EM application, often called two-dimensional classification, is estimating a small number of representative projection images from the entire dataset of noisy two-dimensional projection images. One of the implementations of the disclosed approach is as follows. One first averages over the low-order moments of all two-dimensional projections. These moments are designed to be invariant to in-plane rotations. Given the estimated moments, one looks for several representative two-dimensional projection images having those averaged moments. One of the computational implementations is using a similar method to the one described in the experimental testing discussed below.

A cryo-EM experiment typically involves acquiring, storing, and processing of hundreds of thousands of images. Current algorithms produce unsatisfactory results in many instances, and since the algorithms require revisiting many of the images many times, they require significant computational resources. Applications, where there are heterogeneous objects, are considered particularly challenging.

In various instances, the disclosed method reduces the dimensionality and size of the data and the computational loads, and in some instances, it is expected to yield better results. The method requires (but is not restricted to) only one pass over the data, and can be applied in a streaming fashion that does not require storing all data.

The disclosed method solves the case of heterogeneous objects which has not been treated. Furthermore, the disclosed method does not rely on the assumption of uniform distributions over the applied operations, and it is not only applicable to statistics that are purely invariant to translation (in the sense that the bi-spectrum is invariant to translations of the measurements in the discussion in the appendix). The disclosed method allows either a known distribution of operations or the estimation of the distribution (implicit or explicit) as means of estimating the object.

FIG. 14 illustrates an example of one method for mapping a heterogeneous object using the techniques discussed above. First, after applying a particle picking mechanism (such as the automatic particle picking mechanism described above) to identify a set of particle images (step 1401), the system estimates the averaged statistics (e.g., lower moments) of the measurements from the set of particle images, without necessarily assuming a prior model of the object, but possibly incorporating prior information (step 1403). The system then uses one of a plurality of computational methods to recover a model of a heterogeneous object (and optionally a distribution of the sampled states and/or operations applied to the object) that agrees with the computed measured statistics (step 1405).

It is possible that the information contained in the computed lower moments is limited compared to the amount of information contained in the dataset of images. This may influence the performance of the method. The invariant statistics are invariant to certain operations but not all operations. For example, rotationally invariant features computed for two-dimensional images are not invariant to shifts of the images. In applications, images are approximately centered, therefore the effect is limited. Some of the limitations can be mitigated by subsequent refinement of the produced estimate using other algorithms, a standard practice in estimation in cryo-EM and XFEL.

The disclosed method has been experimentally tested on a simplified model called multireference alignment (MRA). In MRA, the measurements are noisy cyclically-translated instances of a cyclic signal. The model for the non-heterogeneous case is a simplified model for the measurement process of cryo-EM and XFEL. In the current discussion of heterogeneity, each measurement is a noisy cyclically-translated instance of one of the several unknown signals.

The disclosed approach can be used directly by commercial cryo-EM devices, XFEL, and potentially by standard CT machines. The disclosed approach reduces significantly the dimensionality of the data; it requires significantly lower storage and computational load.

As discussed above, some implementations provide an image processing system configured to provide a 3D ab-initio model for the molecular structure obtained from low-order moments of cryo-EM projection images. Autocorrelation analysis can be used to determine the 3D structure of the molecule under the assumption that the viewing directions of the projection images are uniformly distributed over a sphere. However, in some implementations, this approach may give rise to a problem of orthogonal retrieval in cryo-EM, which basically means that the autocorrelation (equivalent to second order moment) alone cannot uniquely determine the 3D structure. Accordingly, in some implementations, a third order product is also used, which in turn makes the problem much more complicated to solve. Specifically, it is much harder to have an accurate estimation of the third moment as the variance of the noise increases by a power of three and many more samples (e.g., projection images) are needed to suppress the same level of noise compared to the first and second order products.

However, a reconstruction procedure that uses only the first and second moments of the noisy projections can be implemented by exploiting the non-uniformity of the distribution of viewing directions in the set of samples (e.g., projection images). In particular, both the 3D structure and the 2D projections can be represented via appropriate bases (e.g., using basis functions) and explicit forms for the moments can then be derived in terms of the expansion coefficients. These derived formulas illustrate the dependencies between the 3D volume and the distribution of viewing directions; while the distribution remains linear in both the first and second moment, the volume is linear in the first moment and quadratic in the second. Therefore, determining the 3D structure is equivalent to solving a system of quadratic polynomials with many more constraints than unknowns (i.e., an overdetermined equation system). Mathematically, this method enables the determination of a 3D structure of a particle using only first and second order moments and does not require a uniform distribution of projection images or the determination of a third order moment.

FIG. 15 illustrates an example of a method for constructing a 3D digital model of a molecule using first and second order moments. First, a set of particle projection images is acquired—for example, by applying a particle picking mechanism such as described in the examples above to a captured micrograph image (step 1501). For each projection image, the system determines a representation of the particle with respect to a steerable basis (step 1503). The representations are then averaged to estimate the first two moments (e.g., a first moment and a second moment) of the particle images (step 1505). Using the estimated first two moments for the particle projection images, the system automatically solves a system of polynomial equations for (a) the representation coefficients of a 3D structure and (b) the representation coefficients of the viewing direction distribution for the particle projection images (step 1507). Based on the solved system of polynomial equations, the image processing system is able to synthesize the representation to form an ab-initio 3D model of the molecule (step 1509).

As a further example, in some implementations, the system is configured to represent a Fourier transform of the three-dimensional structure in spherical coordinates by a series expansion of the form:

$$\phi(\rho,\theta,\varphi)=\Sigma_{l,m,s}A_{l,m,s}A_{l,m,s}r_{l,s}(\rho)Y_{l,m}(\theta,\varphi) \qquad (8)$$

where $r_{l,s}$ are functions of the radial frequency $\rho$, $Y_{l,m}$ are the spherical harmonics, and $A_{l,m,s}$ are the expansion coefficients.

In addition, the distribution over the three-dimensional rotation group SO(3) is denoted by the equation:

$$v(R)=\Sigma_{l,m,n}B_{m,n}{}^{l}D_{m,n}{}^{l}(R) \qquad (9)$$

where $D_{m,n}{}^{l}(R)$ is the Wigner D-matrix of order l, R is a rotation matrix (an element of SO(3)), and $B_{m,n}{}^{l}$ are the expansion coefficients.

Then, the image processing system derives the polynomials equations from the explicit form of the first and second moments, $\mu_1$, $\mu_2$, respectively. The moments are parameterized by the radial and angular resolution of the images which are denote by k, φ. Accordingly, the image processing system in this example utilizes an equation system defined as:

$$\begin{cases} \mu_1(k,\varphi) = \sum_{l,m,n,s} C_{k,\varphi}(l,m,n,s) A_{l,m,s} B^l_{-m,-n} & (10) \\ \mu_2(k_1,\varphi_1,k_2,\varphi_2) = \sum_{\substack{l_1,m_1,n_1,s_1 \\ l_2,m_2,n_2,s_2,p}} F_{k_1,\varphi_1,k_2,\varphi_2}(l_1,l_2,n_1,n_2,s_1,s_2) \\ \qquad\qquad A_{l_1,m_1,s_1} A^*_{l_2,m_2,s_2} B^p_{m_1-m_2,n_1-n_2} \end{cases}$$

where $C_{k,\varphi}$ and $F_{k_1,\varphi_1,k_2,\varphi_2}$ are multi-arrays of fixed coefficients, independent of $A_{l,m,s}$ and $B_{m,n}^l$. By solving for $A_{l,m,s}$ and $B_{m,n}^l$, the three-dimensional structure $\phi$ can be formed explicitly.

In practice, the representation of the 2D images and 3D structure allows different properties of the data to be retained according to the preferences of the user. An example of such a property which plays a significant role in cryo-EM is the ability to efficiently represent rotation transformations, also known as steerable representation. To this end, using the Fourier-Bessel basis one can exploit the steerability of the covariance matrix of the projections and implement advanced denoising schemes for cryo-EM data. Other bases which can also lead to advantageousness properties include, for example, steerable PCA, Prolates, and spherical Bessel. In various different implementations, these representations or other bases can be implemented in the methods discussed herein based, for example, on the particular application and/or user preference.

One of the main advantages in estimating the 3D structure via moments is the capability of solving this problem in an efficient, single-pass optimization scheme. In other words, while reading the data the empirical moment statistics are updated. Accordingly, the need for expensive iterations and storage space is significantly reduced. In some implementations based on the examples described above, a system is configured to perform optimization by searching for a volume and a distribution that match the estimated moments that have been collected from the data. Therefore, the search space of the optimization is independent of the number of projections, which is typically quite large. Instead, in various different configurations, the system is configured to utilize advanced gradient descent optimization algorithms, such as trust-regions, pseudo-Newton, and interior-point, to maximize the fitting of the volume to the moments. Accordingly, the running time and space of the optimization is proportional to the resolution of the 3D structure and not to the size of the input 2D image data, thereby providing a faster reconstruction.

Figure 16A:
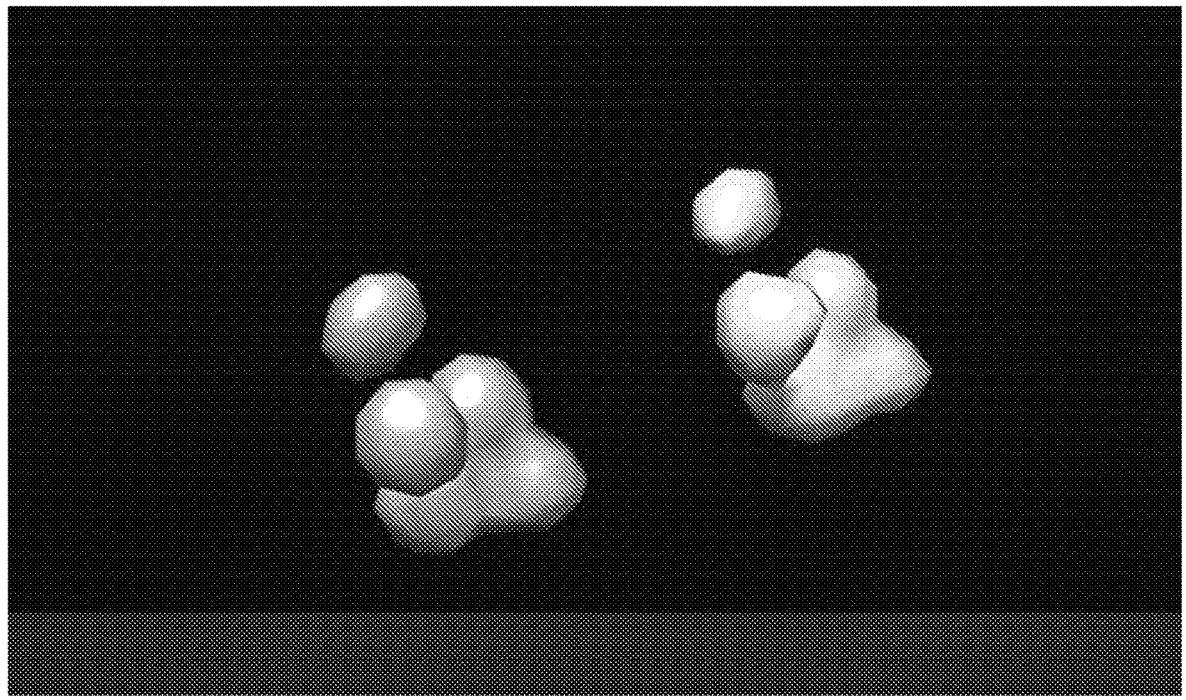
FIG. 16A is a perspective view of a ground truth 3D molecule and a 3D reconstruction of the molecule generated using the method of FIG. 15.
Figure 16B:
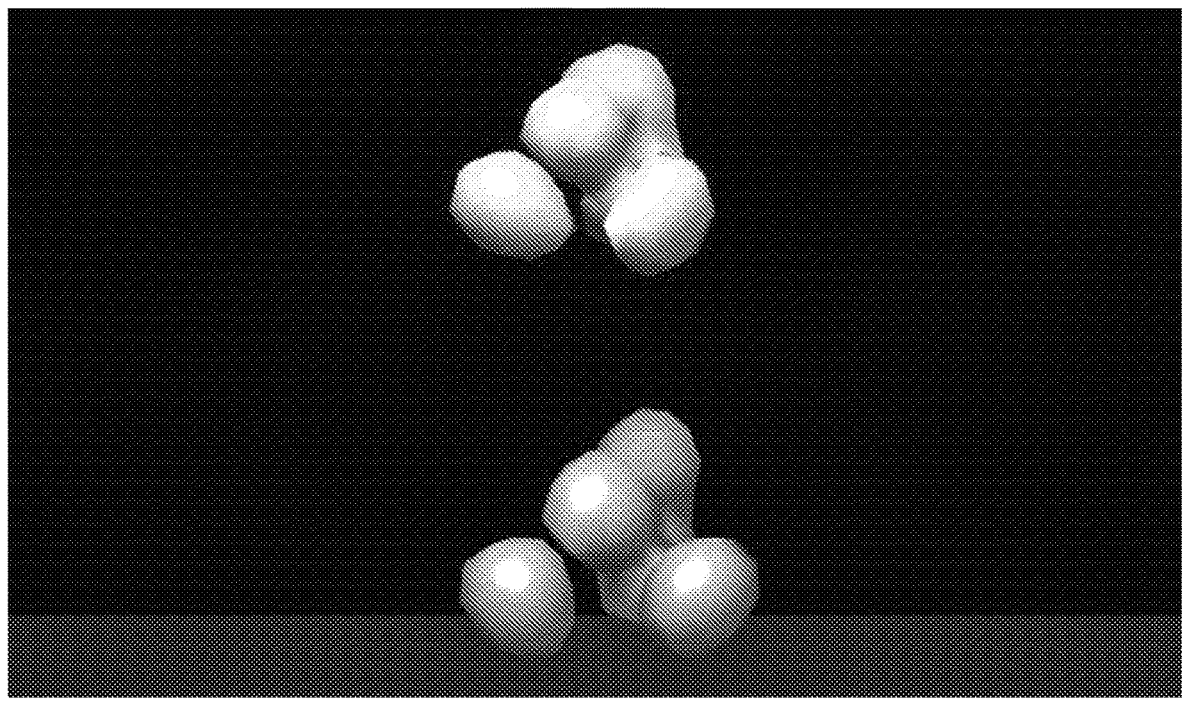
FIG. 16B is a perspective view of the ground truth 3D molecule and the 3D reconstruction of the molecule of FIG. 16A from a different viewing angle.

An example of a 3D reconstruction is given in FIGS. 16A and 16B. The object on the right in FIG. 16A and on the bottom in FIG. 16B is an example of a ground truth simulated 3D structure from which 2D projection images at randomly selected viewing directions that are sampled from a non-uniform distribution. The object on the left in FIG. 16B and on the top in FIG. 16B is a 3D mapped reconstruction determined based on the 2D projection images of the ground truth simulated 3D structure using only the first two moments of the original structure and a fast optimization scheme as described above.

As a byproduct of the reconstruction methods described above, the system may be configured to estimate the distribution of the known rotations of the particle in the projections (i.e., the viewing directions from which the projection images were taken). This distribution can be further exploited as an input for other further refinement procedure in order to accelerate and improve the results of the refinement procedures. Furthermore, because some of the methods described above take advantage of non-uniformity of the viewing directions of projection images, the system, in some implementations, can be configured to impose non-uniformity in the data acquisition stage (e.g., in capturing the micrograph image or in extracting projection images from the micrograph). For example, the design of the cryo-EM experiment itself can be adjusted or controlled so that non-uniformity is highlighted in order to improve the accuracy of the ab-initio model and to reduce the amount of time required to generate the model. Lastly, the examples described above allow reconstruction of the 3D model of a particle under an extremely high level of noise, which, in turn, improve the ability to derive ab-initio models for small particles.

Although the specific examples for particle picking described above address identifying and extracting two dimensional projections of only a single type of molecule, in some implementations, the systems and methods described above are adapted and implemented to identify and extract two-dimensional projections of multiple different types of molecule—for example, in cases where the sample pictured in the micrograph includes multiple different types of molecules or heterogeneous/time-varying molecules. Similarly, although specific examples described above for constructing a two-dimensional model from a plurality of two-dimensional projection images may address constructing only a single three-dimensional model, in some implementations, the systems and methods described above are adapted and implemented to generate multiple three-dimensional models—for example, in the case of heterogeneity.

Thus, the invention provides, among other things, fully-automated and template-free systems and methods for identifying and locating two-dimensional projections of particles in micrograph images, and quickly determining three-dimensional molecular structures from these identified projections. Various features and advantages of the invention are set forth in the following claims.

What is claimed is:

1. A method for automatically locating and extracting a plurality of two-dimensional projections of particles in a micrograph image, the method comprising:

receiving, by an electronic processor, a micrograph image of a sample including a plurality of particles of a first type;

automatically assembling, by the electronic processor, a set of reference images from the micrograph image, wherein the set of reference images includes a first plurality of reference images that contain image data of at least one particle of the first type and a second plurality of reference images that do not contain image data of the particle of the first type, by analyzing image data from the micrograph image in each of a plurality of partially overlapping windows, identifying a subset of windows with image data satisfying at least one statistic criterion compared to other windows in the plurality of partially overlapping windows, and including the image data of each window of the identified subset of windows as a reference image in the set of reference images;

analyzing image data from the micrograph image in each of a plurality of query image windows by calculating a cross-correlation between the image data in each of the plurality of query image windows and each reference image of the set of reference images, wherein analyzing the image data from the micrograph image in each of the plurality of query image windows includes calculating a value indicative of a response signal for each query image window based on the calculated cross-correlation; and automatically identifying, based at least in part on the cross-correlation, a plurality of locations in the micrograph image each containing a two-dimensional projection of a different instance of a particle of the first type, wherein automatically identifying the plurality of locations in the micrograph image each containing a two-dimensional projection of a different instance of the particle of the first type includes determining that a query image window of the plurality of query image windows includes a two-dimensional projection of an instance of the particle of the first type when the value indicative of the response signal for the query image window exceeds a first threshold; and determining that the query image window does not include a two-dimensional projection of the instance of the particle of the first type when the value indicative of the response signal for the query image window is less than a second threshold.

2. The method of claim 1, further comprising:

extracting a plurality of images of two-dimensional projections of the particle based on the plurality of identified locations in the micrograph image; and generating a three-dimensional model of the particle based on the plurality of images of the two-dimensional projections of the particle extracted from the micrograph image.

3. The method of claim 1, wherein automatically assembling, by the electronic processor, the set of reference images from the micrograph image further includes dividing an image area of the micrograph image into a plurality of container areas, wherein analyzing the image data from the micrograph image in each of the plurality of partially overlapping windows includes calculating a mean intensity and a variance for the image data in each of the plurality of overlapping windows, and wherein identifying the subset of windows with image data satisfying the at least one statistic criterion includes identifying, in each containing area of the plurality of container areas, a window with a highest mean intensity as compared to other windows in the same container area, a window with a lowest mean intensity as compared to the other windows in the same container area, a window with a highest variance as compared to the other windows in the same container area, and a window with a lowest variance as compared to the other windows in the same container area.

4. The method of claim 1, wherein analyzing the image data from the micrograph image in each of the plurality of query image windows by calculating a cross-correlation between the image data in each of the plurality of query image windows and each reference image of the set of reference images includes calculating a normalized cross-correlation between each query image window and each reference image by calculating the cross-correlation between the query image window and the reference image at each of a plurality of offsets.

5. The method of claim 1, wherein calculating the value indicative of the response signal for each query image window based on the calculated cross-correlation includes determining, for each query image window of the plurality of query image windows, a number of reference images in the set of reference images for which the cross-correlation between the reference image and the query image window exceeds a threshold.

6. The method of claim 1, wherein calculating the value indicative of the response signal for each query image window based on the calculated cross-correlation includes determining, for each query image window of the plurality of query image windows, a maximum normalized cross-correlation value between the query image window and each of the reference windows.

7. The method of claim 1, wherein the first threshold and the second threshold are calculated based at least in part on an analysis of the image data from the micrograph image.

8. A method for automatically locating and extracting a plurality of two-dimensional projections of particles in a micrograph image, the method comprising:

receiving, by an electronic processor, a micrograph image of a sample including a plurality of particles of a first type;

automatically assembling, by the electronic processor, a set of reference images from the micrograph image, wherein the set of reference images includes a first plurality of reference images that contain image data of at least one particle of the first type and a second plurality of reference images that do not contain image data of the particle of the first type, by analyzing image data from the micrograph image in each of a plurality of partially overlapping windows, identifying a subset of windows with image data satisfying at least one statistic criterion compared to other windows in the plurality of partially overlapping windows, and including the image data of each window of the identified subset of windows as a reference image in the set of reference images;

analyzing image data from the micrograph image in each of a plurality of query image windows by calculating a cross-correlation between the image data in each of the plurality of query image windows and each reference image of the set of reference images, wherein analyzing the image data from the micrograph image in each of the plurality of query image windows includes calculating a value indicative of a response signal for each query image window based on the calculated cross-correlation;

automatically assembling a training set of image data for a classifier based at least in part on the value indicative of the response signal for each of the plurality of query image windows;

training a classifier based on the training set of image data from the micrograph image; and automatically identifying, based at least in part on the cross-correlation, a plurality of locations in the micrograph image each containing a two-dimensional projection of a different instance of a particle of the first type, wherein automatically identifying a plurality of locations in the micrograph image each containing a two-dimensional projection of a different instance of the particle of the first type includes analyzing the micrograph image using the trained classifier.

9. The method of claim 8, wherein training the classifier based on the training set of image data from the micrograph image includes training a support vector machine classifier.

10. The method of claim 8, wherein automatically assembling the training set of image data for the classifier includes identifying a first subset of query image windows, wherein the first subset of query image windows includes a first defined number of query image windows with the highest values indicative of the response signal, identifying a second subset of query image windows, wherein the second subset of query image windows includes a second defined number of query image windows with the highest values indicative of the response signal, assembling a training set of image data for a particle model based on the first subset of query image windows, and assembling a training set of image data for a noise model based on query image windows for the micrograph image that are not included in the second subset of query image windows.

11. The method of claim 10, wherein the second defined number is at least as large as the first defined number and wherein the second subset of query image windows includes all of the query image windows from the first subset of query image windows.

12. The method of claim 8, further comprising generating a binary segmentation image of the micrograph based on an output of the classifier, wherein the binary segmentation image classifies each individual pixel in the micrograph image as either a particle pixel or a noise pixel, wherein particle pixels contain image data indicative of at least part of a two-dimensional projection of a particle of the first type.

13. The method of claim 12, further comprising identifying a plurality of clusters of particle pixels in the micrograph image, wherein each cluster of the plurality of clusters includes a plurality of adjacent particles pixels.

14. The method of claim 13, further comprising
calculating a size of each cluster of the plurality of clusters; and
identifying each cluster with a size less than a maximum threshold size and more than a minimum threshold size as a location in the micrograph image containing a different instance of the particle of the first type.

15. The method of claim 13, further comprising:
calculating, for each cluster of the plurality of clusters, a distance between the cluster and another cluster of the plurality of clusters that is closest to the cluster; and
identifying the cluster as a location in the micrograph image containing an instance of the particle of the first type only when the distance is greater than a threshold distance.

16. The method of claim 13, wherein automatically identifying the plurality of locations in the micrograph image each containing a two-dimensional projection of a different instance of the particle of the first type includes
identifying a center of each cluster of the plurality of clusters,
positioning a frame on the micrograph image for each cluster of the plurality of clusters based on the center of a different individual cluster, wherein the frame for each cluster of the plurality of clusters is of a defined size and shape, and
identifying the image area within each frame as a location of the plurality of locations in the micrograph image containing a two-dimensional projection of a different instance of the particle of the first type.

17. The method of claim 8, further comprising:
extracting a plurality of images of two-dimensional projections of the particle based on the plurality of identified locations in the micrograph image; and
generating a three-dimensional model of the particle based on the plurality of images of the two-dimensional projections of the particle extracted from the micrograph image.

18. The method of claim 8, wherein automatically assembling, by the electronic processor, the set of reference images from the micrograph image further includes dividing an image area of the micrograph image into a plurality of container areas,
wherein analyzing the image data from the micrograph image in each of the plurality of partially overlapping windows includes calculating a mean intensity and a variance for the image data in each of the plurality of overlapping windows, and
wherein identifying the subset of windows with image data satisfying the at least one statistic criterion includes identifying, in each containing area of the plurality of container areas,
a window with a highest mean intensity as compared to other windows in the same container area,
a window with a lowest mean intensity as compared to the other windows in the same container area,
a window with a highest variance as compared to the other windows in the same container area, and
a window with a lowest variance as compared to the other windows in the same container area.

19. The method of claim 8, wherein analyzing the image data from the micrograph image in each of the plurality of query image windows by calculating a cross-correlation between the image data in each of the plurality of query image windows and each reference image of the set of reference images includes
calculating a normalized cross-correlation between each query image window and each reference image by calculating the cross-correlation between the query image window and the reference image at each of a plurality of offsets.

20. The method of claim 8, wherein calculating the value indicative of the response signal for each query image window based on the calculated cross-correlation includes at least one selected from a group consisting of:
determining, for each query image window of the plurality of query image windows, a number of reference images in the set of reference images for which the cross-correlation between the reference image and the query image window exceeds a threshold, and
determining, for each query image window of the plurality of query image windows, a maximum normalized cross-correlation value between the query image window and each of the reference windows.

* * * * *